United States Patent
Isgar

(10) Patent No.: US 12,140,447 B2
(45) Date of Patent: Nov. 12, 2024

(54) TRAVEL-BASED GEO-PAIRED INFORMATION SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 379 days.

(21) Appl. No.: 17/697,307

(22) Filed: Mar. 17, 2022

(65) Prior Publication Data

US 2022/0205806 A1 Jun. 30, 2022

Related U.S. Application Data

(63) Continuation-in-part of application No. 17/555,672, filed on Dec. 20, 2021, now Pat. No. 11,725,961, (Continued)

(51) Int. Cl.

| | |
|---|---|
| *G01C 21/36* | (2006.01) |
| *G01C 21/34* | (2006.01) |
| *G06F 16/29* | (2019.01) |
| *G06F 16/487* | (2019.01) |
| *H04W 4/02* | (2018.01) |

(Continued)

(52) U.S. Cl.
CPC ..... *G01C 21/3682* (2013.01); *G01C 21/3476* (2013.01); *G01C 21/3644* (2013.01); *G06F 16/29* (2019.01); *G06F 16/487* (2019.01); *H04W 4/021* (2013.01); *H04W 4/185* (2013.01)

(58) Field of Classification Search
CPC ............ G01C 21/3682; G01C 21/3476; G01C 21/3644; G01C 21/3679; G01C 21/3697; G06F 16/29; G06F 16/487; G06F 16/9537; H04W 4/021; H04W 4/185; H04W 4/023

See application file for complete search history.

(56) References Cited

U.S. PATENT DOCUMENTS

| | | |
|---|---|---|
| 8,135,624 B1 | 3/2012 | Ramalingam et al. |
| 9,401,771 B2 | 7/2016 | Macleod et al. |

(Continued)

OTHER PUBLICATIONS

Isgar, Charles, Travel-Based Geo-Paired Information System, Patent Cooperation Treaty Application Serial No. PCT/US2020/063594, filed Dec. 7, 2020, International Search Report and Written Opinion dated Jan. 21, 2021.

*Primary Examiner* — Joseph E Dean, Jr.
(74) *Attorney, Agent, or Firm* — Schmeiser, Olsen & Watts LLP

(57) ABSTRACT

Described is a travel-based geo-paired information system. The system includes a server having a memory storing geo-paired information that includes content regarding or related to a point of interest. The system also includes a user computing device coupled to the server. The server may be programmed to receive location information from the user computing device. The server may also be programmed to automatically process the location information and determine whether a location of the user computing device is within a predetermined distance from a point of interest geolocation. Then the server may automatically find and retrieve geo-paired information corresponding to or paired to the point of interest geolocation and automatically deliver to the user computing device, for presenting, the content related to the point of interest corresponding to the location of the user computing device.

12 Claims, 43 Drawing Sheets

Related U.S. Application Data which is a continuation of application No. 16/706,698, filed on Dec. 7, 2019, now Pat. No. 11,204,255.

(60) Provisional application No. 62/776,514, filed on Dec. 7, 2018.

(51) Int. Cl.
  *H04W 4/021* (2018.01)
  *H04W 4/18* (2009.01)

(56) References Cited

U.S. PATENT DOCUMENTS

| | | |
|---|---|---|
| 9,841,814 B1 | 12/2017 | Kallmeyer et al. |
| 11,725,961 B2 * | 8/2023 | Isgar ............... H04W 4/021 455/456.3 |
| 2010/0306211 A1 * | 12/2010 | Chaudhuri ............ G06F 16/29 707/753 |
| 2014/0248911 A1 | 9/2014 | Rouda, Jr. |
| 2015/0052131 A1 * | 2/2015 | Suzuki ................ H04L 67/52 707/736 |
| 2015/0289093 A1 | 10/2015 | Petty et al. |
| 2018/0112996 A1 | 4/2018 | Montell |
| 2018/0192144 A1 * | 7/2018 | McElroy ........... H04N 21/8456 |

* cited by examiner

USER CAN SELECT A POINT OF INTEREST FROM
SEVERAL POINTS OF INTEREST SHOWN ON A
MAP DISPLAYED ON THE USER DEVICE

TRAVEL-BASED GEO-PAIRED INFORMATION SYSTEM

CROSS REFERENCE TO RELATED APPLICATION[S]

This application is a continuation-in-part of U.S. patent application Ser. No. 17/555,672, filed Dec. 20, 2021, which is a continuation of U.S. patent application Ser. No. 16/706,698, filed Dec. 7, 2019, which claims priority to U.S. Provisional Patent Application Ser. No. 62/776,514, filed Dec. 7, 2018, the disclosure of which is hereby incorporated entirely herein by reference.

BACKGROUND OF THE INVENTION

Technical Field

This invention generally relates to information systems providing content to travelers in vehicles, and specifically to a travel-based geo-paired information system for providing content related to points of interest to travelers based on the real time geolocation of the traveler.

State of the Art

Individuals who travel an extended distance often do so in cars, trains, planes or the like. Generally, long-distance travel includes travel through various parts of a state, region or country. Many travelers utilize music, audio books, movies or other forms of entertainment during a long trip over an extended distance. These forms of entertainment are typically stored or otherwise provided on a mobile computing device, a radio, a vehicle audio/video system and the like. However, this entertainment does not correlate to the route travelled. The route travelled by a traveler often includes passage by a historical site, a particular region and monument or other geographical, historical, important and/or interesting location. These locations typically have a story or information that is interesting. There is a lack of systems or devices that can allow a traveler to obtain information about these historical sites, particular regions and monuments or other geographical, historical, important and/or interesting locations.

Accordingly, what is needed is an audio and/or video entertainment system for travelers based on the real-time geolocation of the traveler.

SUMMARY OF THE INVENTION

An embodiment includes a travel-based geo-paired information system comprising: a server having a memory storing geo-paired information; and a user computing device coupled to the server, wherein the server is programmed to: receive location information from the user computing device; automatically process the location information and determine whether a location of the user computing device is within a predetermined distance from a point of interest geolocation; automatically find and retrieve geo-paired information corresponding to the point of interest geolocation; and automatically deliver to the user computing device for presenting the geo-paired information corresponding to the location of the user computing device.

Another embodiment includes a travel-based geo-paired information system comprising: a server having a memory storing geo-paired information; and a user computing device coupled to the server, wherein the server is programmed to: receive a travel route from the user computing device and identify at least one point of interest geolocation along the travel route; automatically find and retrieve geo-paired information corresponding to the at least one point of interest geolocation; automatically deliver for download to the user computing device for presenting the geo-paired information corresponding to the at least one point of interest geolocation; receive location information from the user computing device; automatically process the location information and determine whether a location of the user computing device is within a predetermined distance from a point of interest geolocation; and send instruction to the user computing device to present the geo-paired information in response to determining the location of the user computing device is within the predetermined distance from the at least one point of interest geolocation.

Another embodiment may include a method of using a travel-based geo-paired information system comprising: sending location information from a user computing device to a server, the location information including a location of the user computing device travelling within a vehicle; determining, by the server, whether the location of the user computing device within the vehicle is within a predetermined distance from a point of interest geolocation; retrieving, by the server from memory of the server, geo-paired information corresponding to the point of interest geolocation in response to determining the user computing device is within the predetermined distance from the point of interest geolocation; sending a audible prompt for playing on the user computing device prompting a verbal response from a user if the user wants to stream the geo-paired media; receiving an audible acknowledgment command from the user computing device that the user does want to stream the geo-paired media; and automatically streaming the geo-paired media from the server to the user computing device through a network connection as the user computing device is travelling within the vehicle and in proximity to the point of interest.

Yet, another embodiment may include a method of using a travel-based geo-paired information system comprising: sending location information from a user computing device to a server, the location information including a location of the user computing device travelling within a vehicle; determining, by the server, whether the location of the user computing device within the vehicle is within a predetermined distance from a point of interest geolocation; retrieving, by the server from an Internet source, geo-paired information corresponding to the point of interest geolocation in response to determining the user computing device is within the predetermined distance from the point of interest geolocation; sending a audible prompt for playing on the user computing device prompting a verbal response from a user if the user wants to stream the geo-paired media; receiving an audible acknowledgment command from the user computing device that the user does want to stream the geo-paired media; and automatically streaming the geo-paired media from the server to the user computing device through a network connection as the user computing device is travelling within the vehicle and in proximity to the point of interest.

In embodiments the user computing device may include a portable device, a car computer, a wearable and the like. Further, the system may include the ability to operate with satellite radio systems. Further, embodiments may provide for audible prompts and commands for operation of the system, thereby making it a hands-free system. Further still, the system may include geo-paired information/content that is a game and have age-appropriate content and games for the intended audience utilizing the user computing device. Further, the geo-paired information/content may be audio, video, text, games, and/or combinations thereof. Additionally, the system may include natural language processing to process audible commands by a user and further may also include text-to-speech operations that allows for the reading of text and converting it to speech for playing through the user computing device.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a travel-based geo-paired information system wherein geo-paired information or content corresponds to a geolocation of the traveler and the user computing device used by and located with the traveler.

Figure 1:
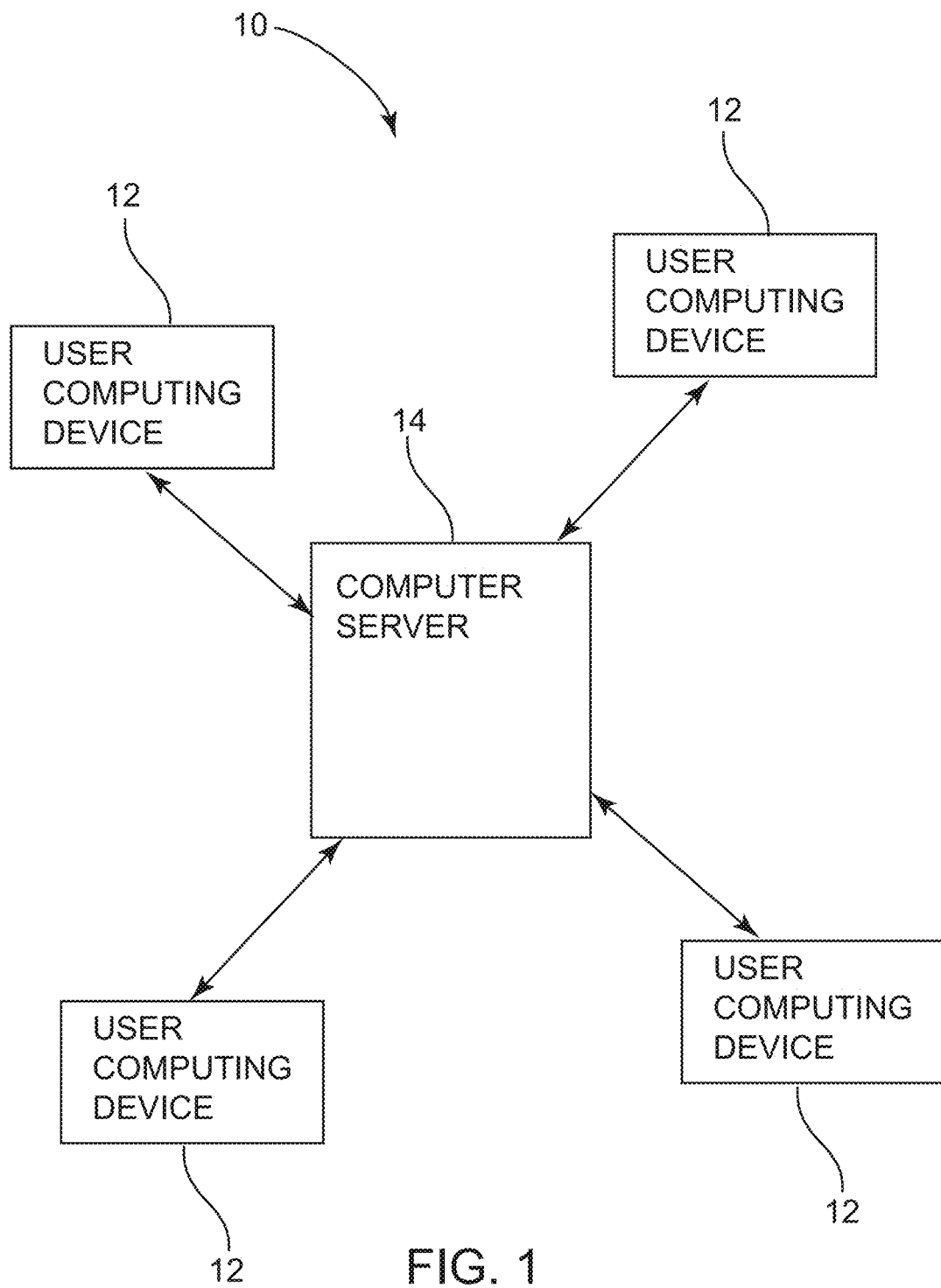
FIG. 1 a diagrammatic view of a travel-based geo-paired information system according to an embodiment.
Figure 2:
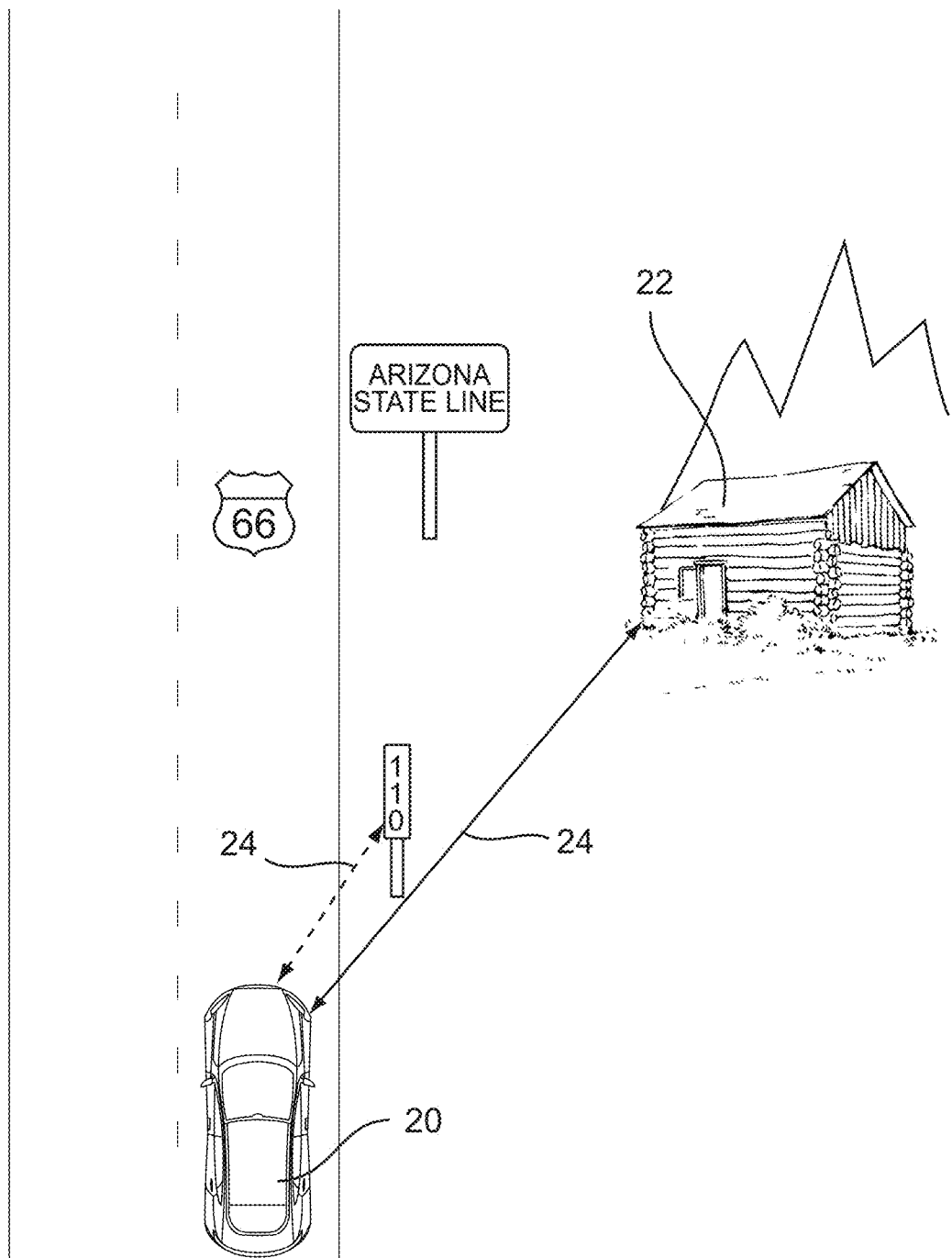
FIG. 2 depicts a travel-based geo-paired information system used in a vehicle that is a predetermined distance from a point of interest geolocation according to an embodiment.
Figure 3:
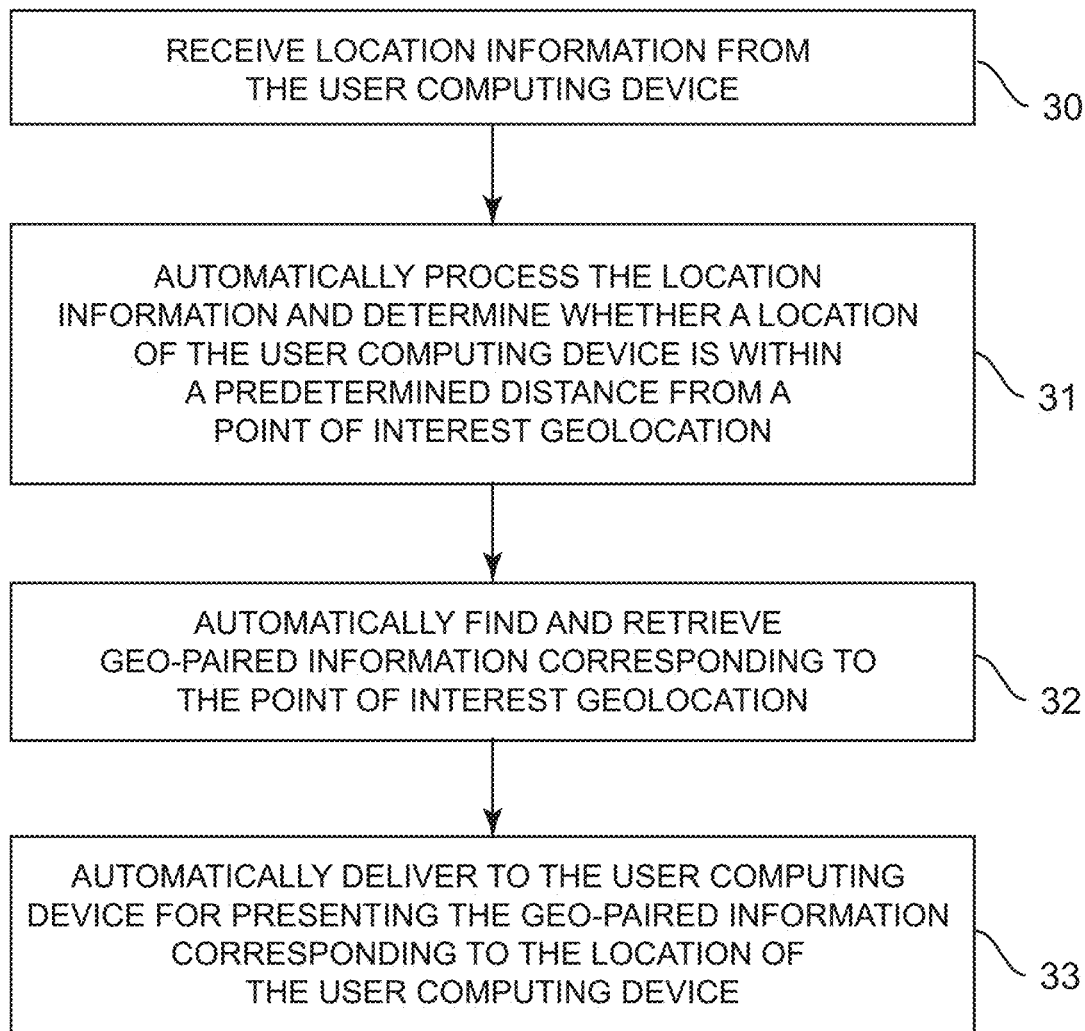
FIG. 3 is a flowchart of programmed instructions executed by a server of a travel-based geo-paired information system according to an embodiment.

FIGS. 1-3 show an embodiment of a travel-based geo-paired information system 10. FIG. 1 shows a diagram of a travel-based geo-paired information system 10. FIG. 2 depicts a travel-based geo-paired information system 10 used by a traveler in a vehicle, such as a car, a bus, a train or the like. FIG. 3 shows a flow chart of programming of a server of the system 10. In embodiments, a traveler includes a driver, a passenger or the like in any type of vehicle.

FIG. 1 depicts an embodiment of a travel-based geo-paired information system 10. The system 10 may include user computing devices 12 and a server 14, wherein each user computing device 12 is coupled to the computer server 14. This coupling may be a network connection, such as through an Internet connection, a Wi-Fi connection, a Bluetooth connection or the like, wherein the user computing devices 12 may communicate with and receive communication from the server 14. The user computing device 12 may include a desktop computer, a laptop, a tablet, a smartphone, a vehicle-installed computing device and the like. The server 14, in some embodiments, may be a cloud-based infrastructure architecture.

The server 14 may include a memory storing various data. The memory of the server 14 may store geo-paired information corresponding to particular points of interest geolocations, wherein location information for the points of interest geolocations is also stored and associated with the geo-paired information corresponding to the geolocations. This may be geo-paired information about the point of interest geolocation, such as historical geo-paired information relating to a point of interest geolocation, a historical account of an event occurring at a point of interest geolocation, information about the creation of a structure at a point of interest geolocation and the like. In other words, the geo-paired information may be about the geology, history or any other information regarding the point of interest of that segment of the route travelled. Further, in some embodiments, the geo-paired information for presentation on the user computing device 12 may be customized to certain lengths to pair with the route and the speed of travel by the user in order to correspond the information with the point of interest as the user is travelling past the point of interest.

The user computing device 12 may be coupled to the server 14, and, referring to FIGS. 2 and 3, the server 14 may be programmed to receive location information from the user computing device (Step 30); automatically process the location information and determine whether a location of the user computing device is within a predetermined distance from a point of interest geolocation (Step 31); automatically find and retrieve geo-paired information corresponding to the point of interest geolocation (Step 32); and automatically deliver to the user computing device for presenting the geo-paired information corresponding to the location of the user computing device (Step 33). In some embodiments, the user computing device 12 may be utilized by a traveler within a vehicle 20 (See FIG. 2). The user computing device 12 may be operating a mobile app as part of the system 10, wherein operation of the mobile app couples the user computing device 12 to the server 14. The user computing device 12 operating the mobile app, may further operated to determine its location and send the location data to the server through the established connection. This location data, for example, may be location data obtainable by a smartphone and then sent to the server 14.

As shown in FIG. 2, the user computing device 12 may be within vehicle 20 and the location may be sent to the server 14. The location may be within a predetermined distance 24 of the point of interest geolocation 22, thereby initiating the sending of geo-paired information corresponding to the geolocation 22 to the user computing device 12 within the vehicle 20.

Figure 4A:
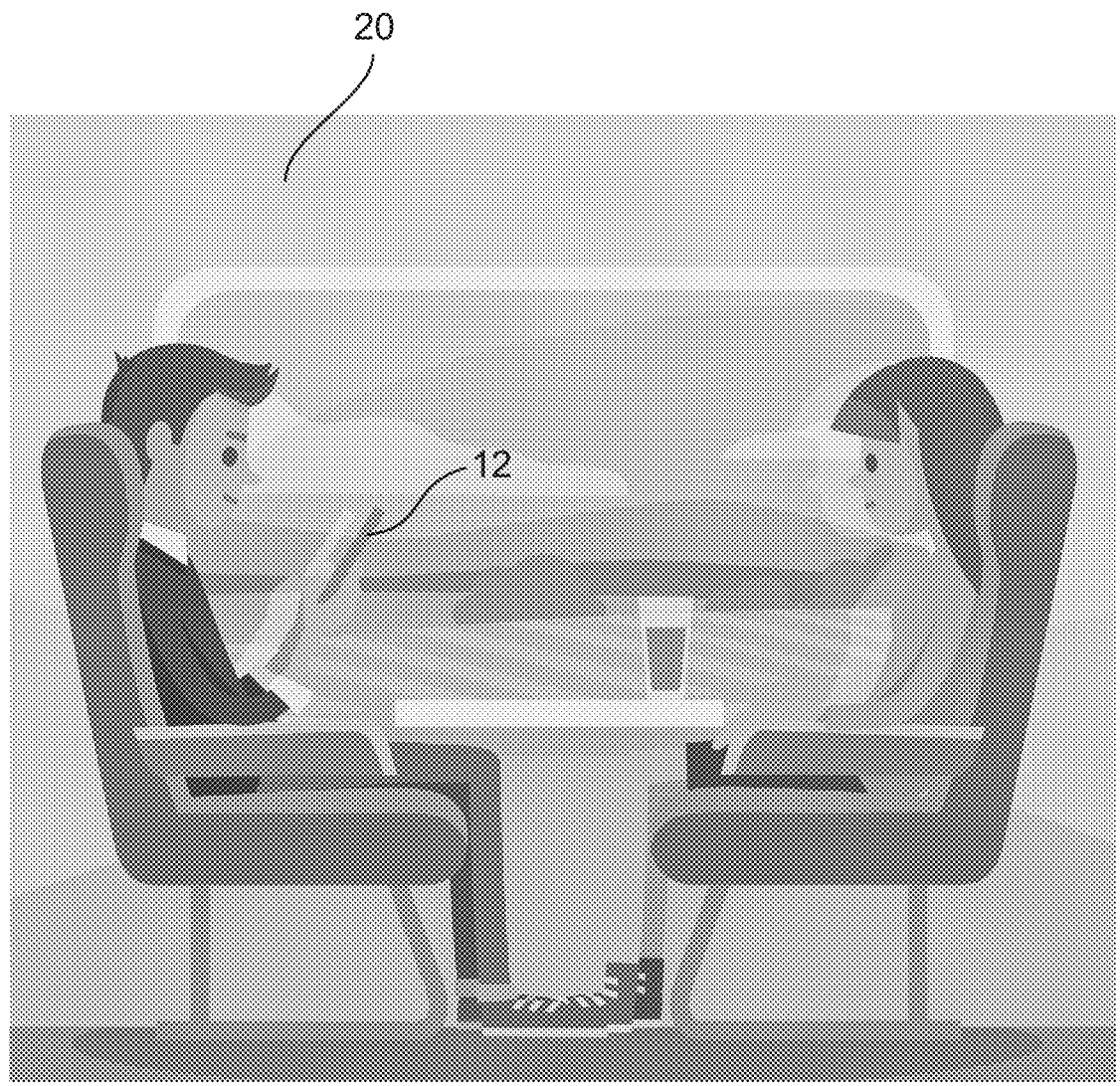
FIG. 4A depicts a travel-based geo-paired information system used in a vehicle according to an embodiment.
Figure 4B:
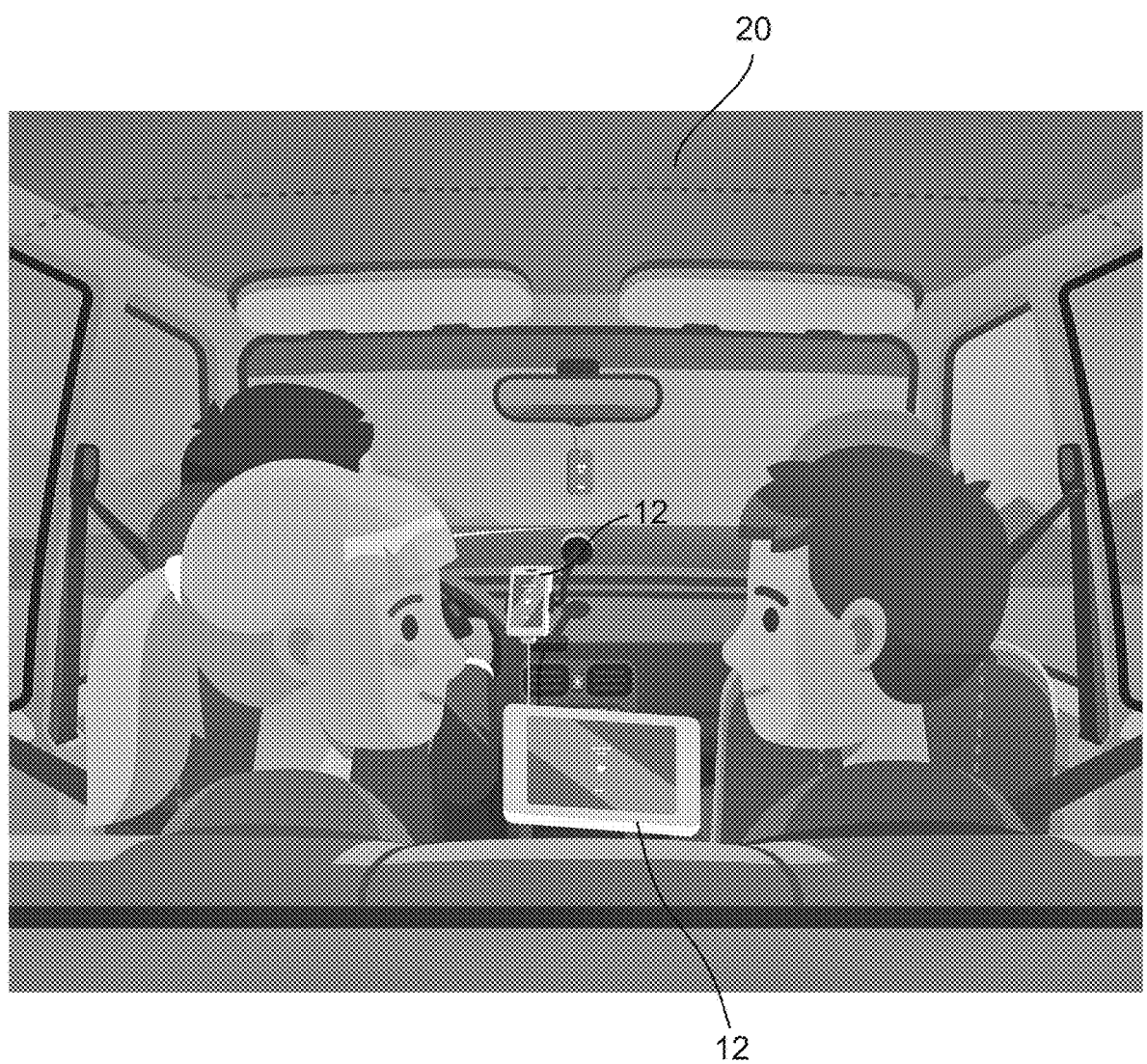
FIG. 4B depicts a travel-based geo-paired information system used in a bus or train according to an embodiment.

The vehicle 20 may include any type of vehicle, such as a car depicted in FIGS. 2 and 4B, a train and/or bus as depicted in FIG. 4A, a plane, a ship or any other type of vehicle that may not be depicted, wherein users can utilize for travel.

Once the geo-paired information is sent to the user computing device 12, the geo-paired information is automatically initiated to play. In some embodiments, there may be several points of interest that are available based on the location of the user computing device 12. In these instances, the server 14 may be programmed to send a list of geo-paired information to the user computing device for selection, the list including different points of interest, wherein the user may select a desired geo-paired information associated with a desired point of interest to present on the user computing device 12. Further still, the server 14 may also be programmed to send a list of geo-paired information to the user computing device for selection, the list including different content types of geo-paired information of a point of interest or multiple points of interest. The different content types of geo-paired information may include historical content, geology content, a kid version content, a teen version content, an adult version content and the like. In embodiments, the server may be programmed to supply lists for both multiple points of interest and different types of content associated with the multiple points of interest to the user computing device 12 for selection by the user.

Figure 5A:
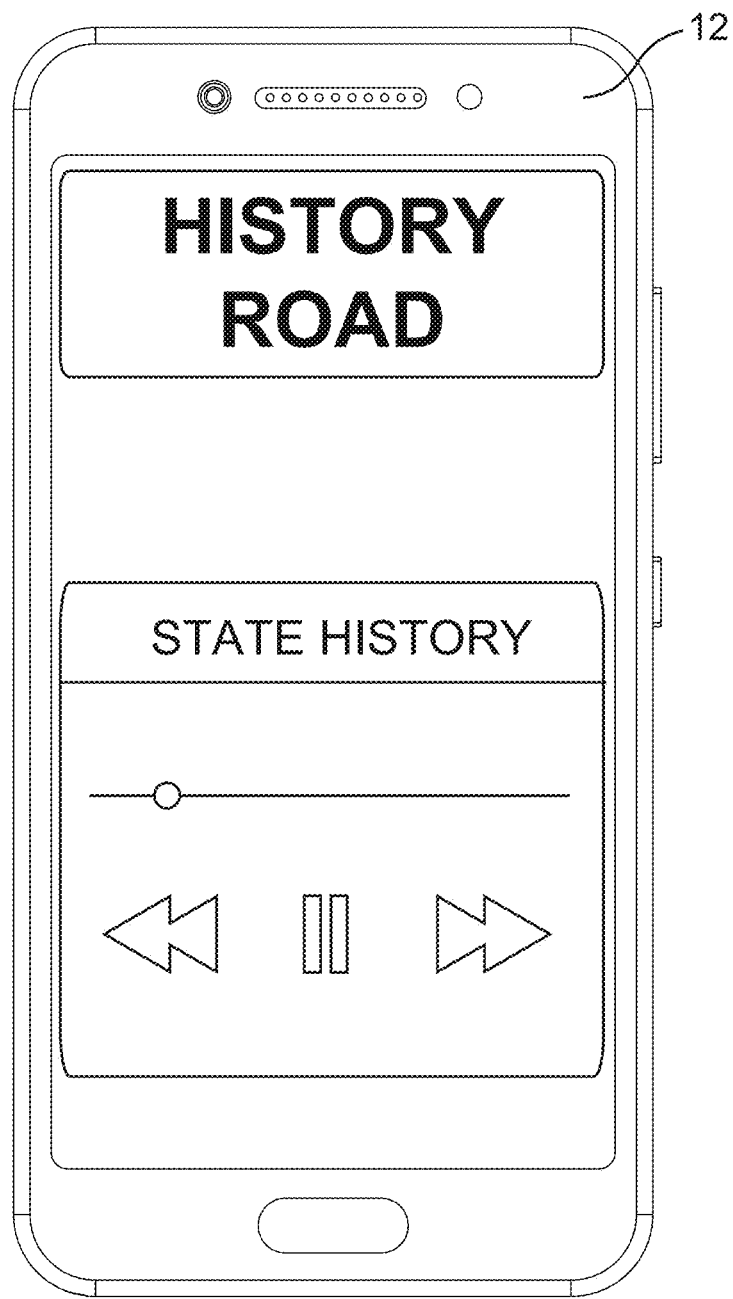
FIG. 5A depicts a user computing device of a travel-based geo-paired information system according to an embodiment.
Figure 5B:
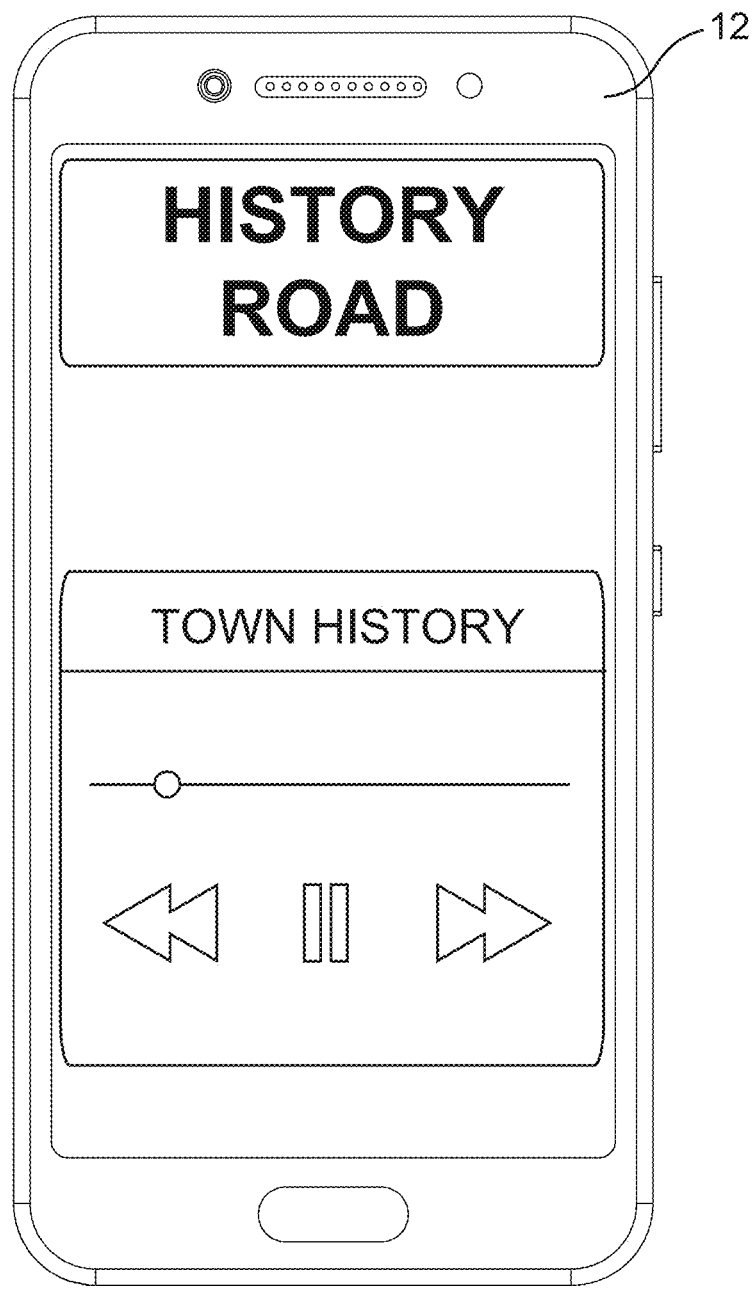
FIG. 5B depicts a user computing device of a travel-based geo-paired information system according to an embodiment.
Figure 5C:
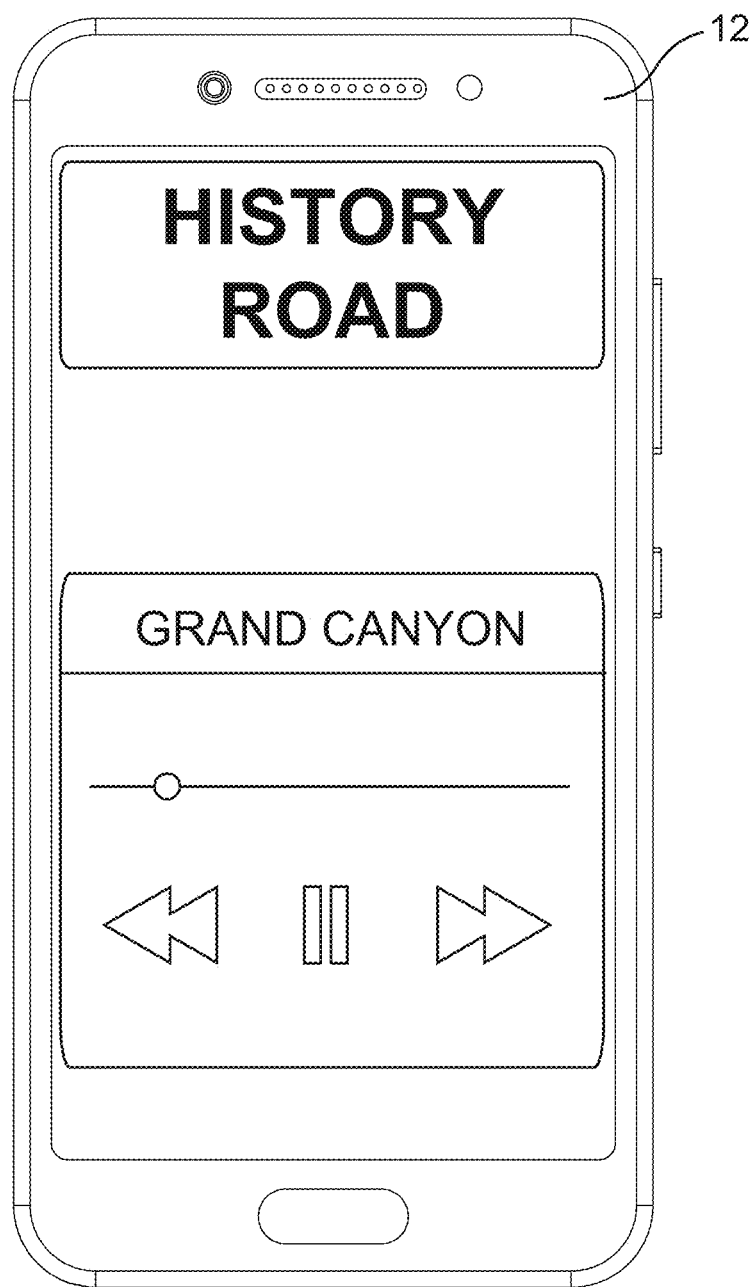
FIG. 5C depicts a user computing device of a travel-based geo-paired information system according to an embodiment.
Figure 5D:
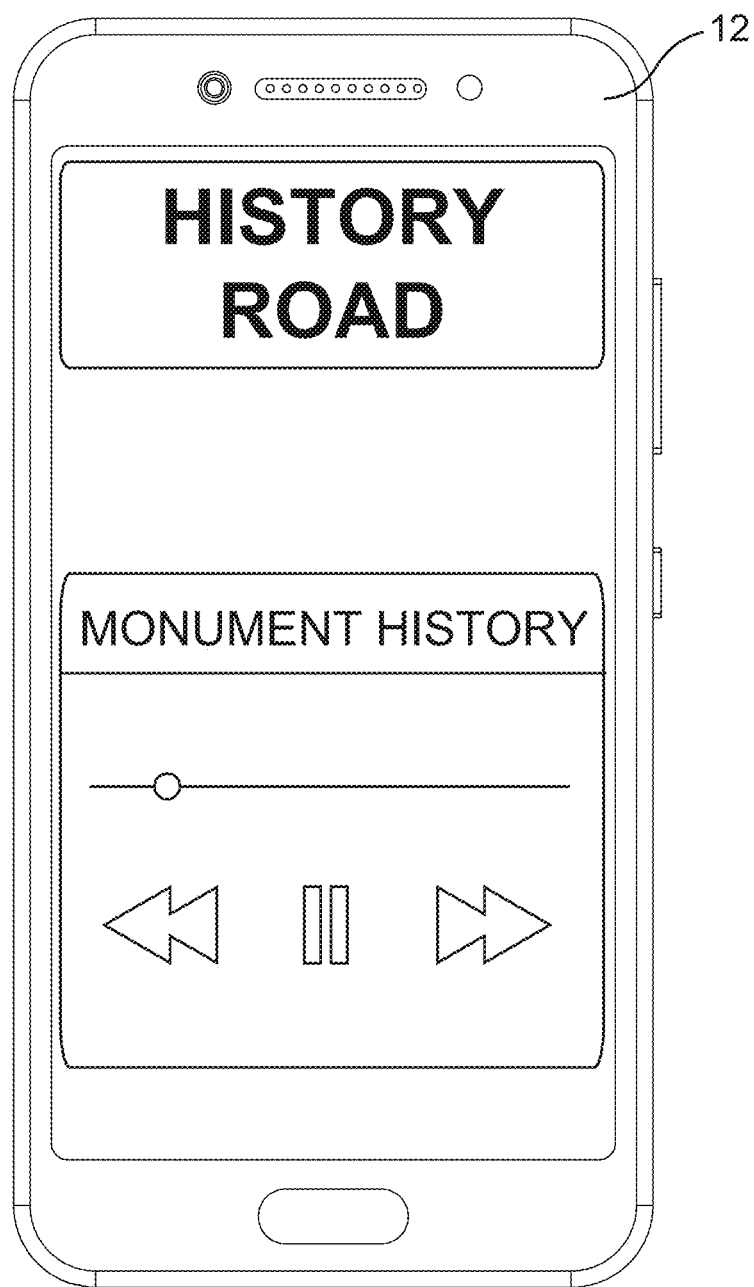
FIG. 5D depicts a user computing device of a travel-based geo-paired information system according to an embodiment.
Figure 5E:
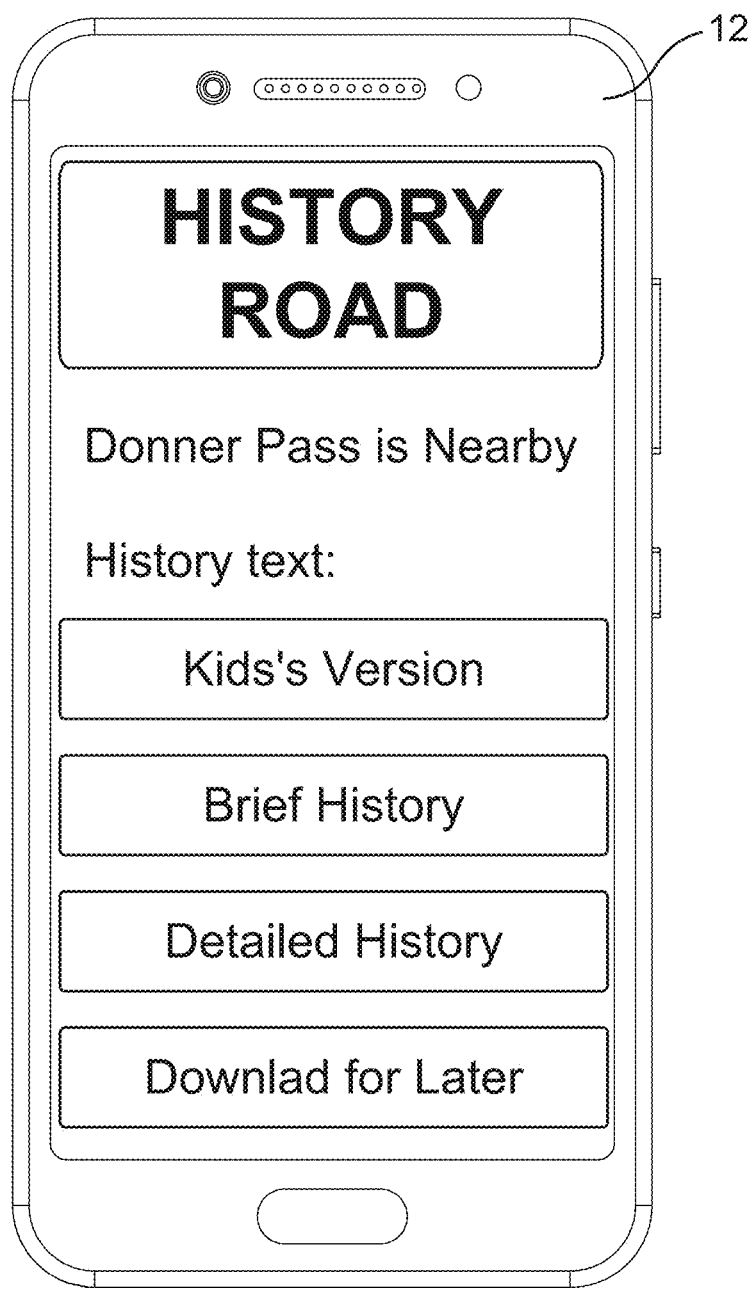
FIG. 5E depicts a user computing device of a travel-based geo-paired information system according to an embodiment.

It will be understood that the geo-paired information may correspond to the profile of the user, wherein the user may set certain likes and/or dislikes in order for the system to determine the type or types of content the user is interested in. For example, FIGS. 5A-5D depict various types of geo-paired information that may match user interest. FIG. 5A depicts a user computing device 12 presenting or playing a state history related geo-paired information, wherein the user may learn the history of a point of interest, such as a historical element from a state as the user crosses the state line, including state history, industrial history and the like. As shown in FIG. 5B, depicted is a user computing device 12 presenting or playing a town history related geo-paired information, wherein the user may learn the history of a point of interest, such as a historical element from a town as the user travels through or by a town. As shown in FIG. 5C, depicted is a user computing device 12 presenting or playing a natural feature history related geo-paired information, wherein the user may learn the history of a point of interest, such as a the Grand Canyon, the Mississippi River or other type of natural feature. As shown in FIG. 5D, depicted is a user computing device 12 presenting or playing a monument history related geo-paired information, wherein the user may learn the history of a point of interest, such as the Alamo, Gettysburg or other type of monument. It will be understood that all types of geo-paired information such as history, state history, town history, natural feature history, monument history and the like that may be associated with particular geo locations of particular points of interest.

The geo-paired information may be audio, audio/visual, text, text and graphics, video, and the like, that recounts information specific to a point of interest geolocation. It is contemplated that the driver may elect to receive the geo-paired information in a form that complies with state driving laws, while passengers may have the same or alternative feeds of information. The geo-paired information may include existing content and very likely includes original content that may be specifically created for this unique system to be paired with points of interest along specific travel segments. A point of interest may include natural or manmade features or even mile markers wherein the geo-locations are determined and stored in memory of the system 10 and available for processing to determine if the location of the user computing device 12 is within a predetermined distance from the point of interest geolocations. In embodiments, the geo-paired information may be streamed from the server 14 to the user computing device 12.

Figure 6:
FIG. 6 depicts a user computing device of another embodiment of a travel-based geo-paired information system wherein the system downloads content to a user computing device according to an embodiment.

In other embodiments, as depicted in FIG. 6, the geo-paired information may be downloadable from the server 14 to the user computing device 12. In these embodiments, the traveler may utilize a mobile app on the user computing device 12 to plan a travel route. The planned travel route may be sent to the server 14. The system 10 may then download all geo-paired information associated with the travel route. During travel, as the user computing device 12 is within a predetermined distance from a point of interest geolocation, the mobile app may automatically initiate playing of geo-paired information on the user computing device, wherein the geo-paired information corresponds to the geo-location. Embodiments where the system allows for download of geo-paired information, the user may manually select to play certain content.

Figure 7:
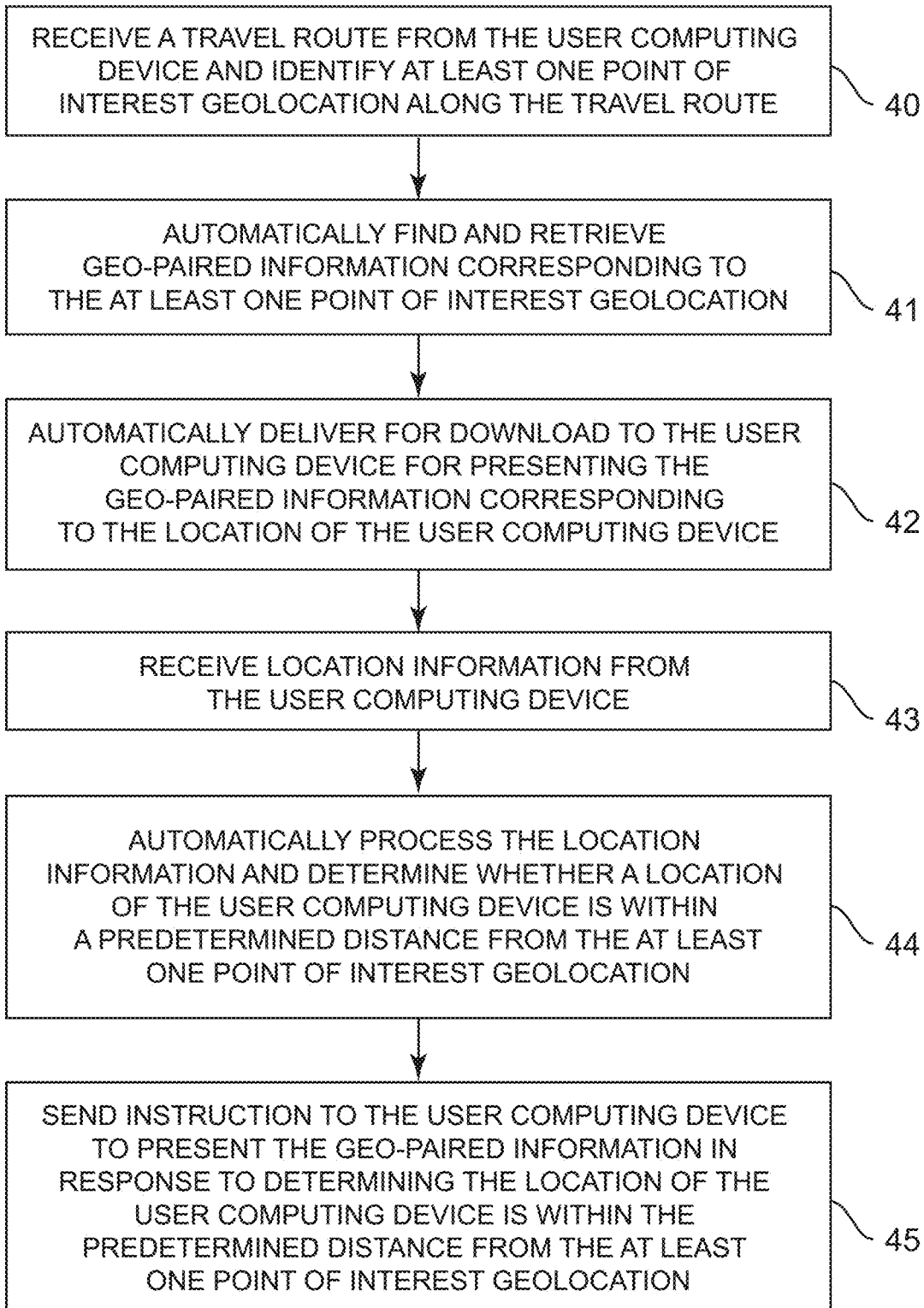
FIG. 7 is a flowchart of programmed instructions executed by a server of a travel-based geo-paired information system as shown in FIG. 6 according to an embodiment.
Figure 8:
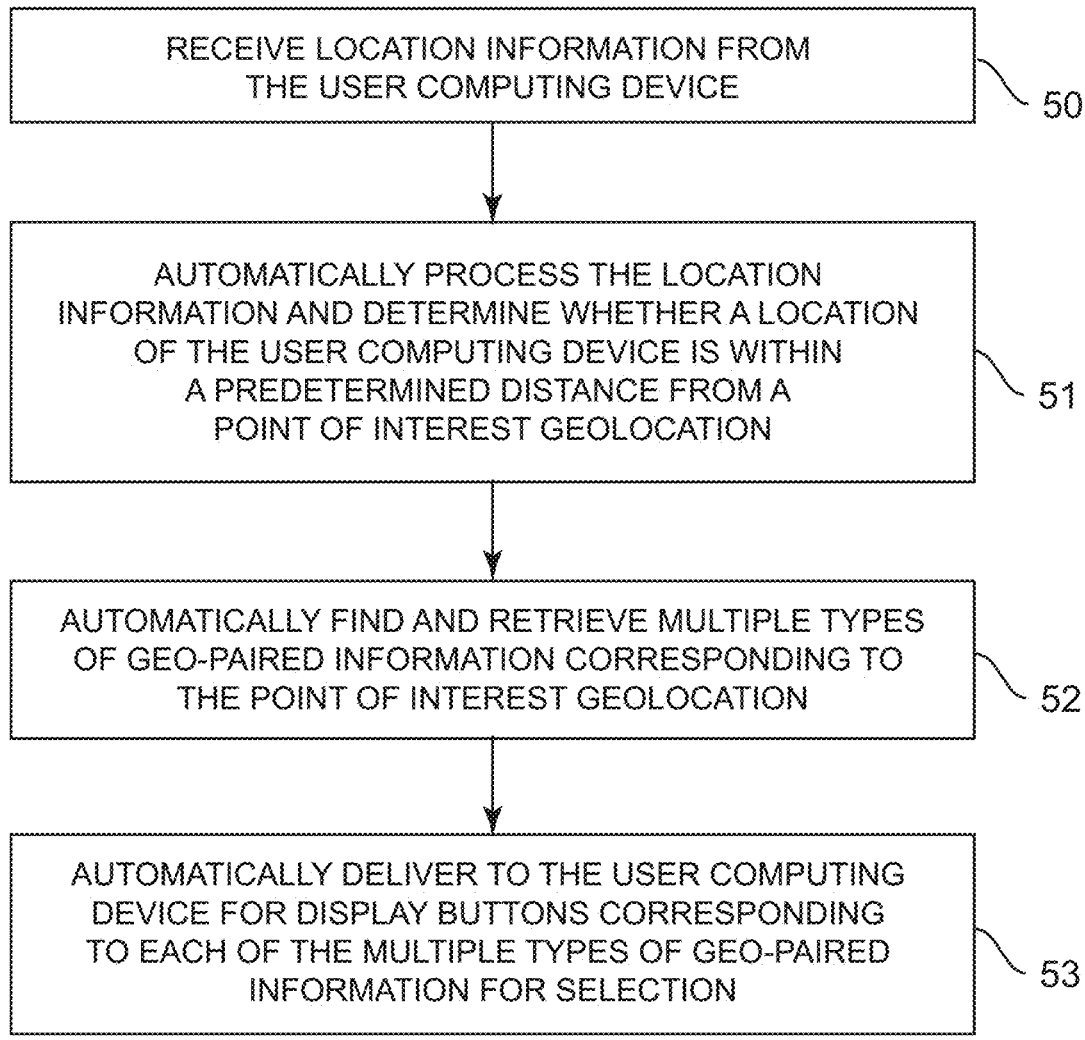
FIG. 8 is a flowchart of programmed instructions executed by a server of a travel-based geo-paired information system according to an embodiment.

In these embodiments as depicted in FIG. 6, and with additional reference to FIG. 7, the system 10 may include the server 14 programmed to receive a travel route from the user computing device and identify at least one point of interest geolocation along the travel route (Step 40); automatically find and retrieve geo-paired information corresponding to the at least one point of interest geolocation (Step 41); automatically deliver for download to the user computing device for presenting the geo-paired information corresponding to the at least one point of interest geolocation (Step 42); receive location information from the user computing device (Step 43); automatically process the location information and determine whether a location of the user computing device is within a predetermined distance from a point of interest geolocation (Step 44); and send instruction to the user computing device to present the geo-paired information in response to determining the location of the user computing device is within the predetermined distance from the at least one point of interest geolocation (Step 45).

By way of example only, and not as a limitation, the system 10 may include an original creation of geo-paired information, such as, by a leading historian of a state like the State of Colorado and the information may be regarding the city of Aspen, the content created by the leading historian would be saved in the server 14 as geo-paired information because it is paired with the geolocation of Aspen, Colorado. When a user of the system is within a predetermined distance of Aspen, Colorado, the system may automatically deliver the originally created geo-paired information for the history, the geology, or other types of content, to the user computing device 12 for presenting the geo-paired information to the user according to the user's preference.

Figure 9A:
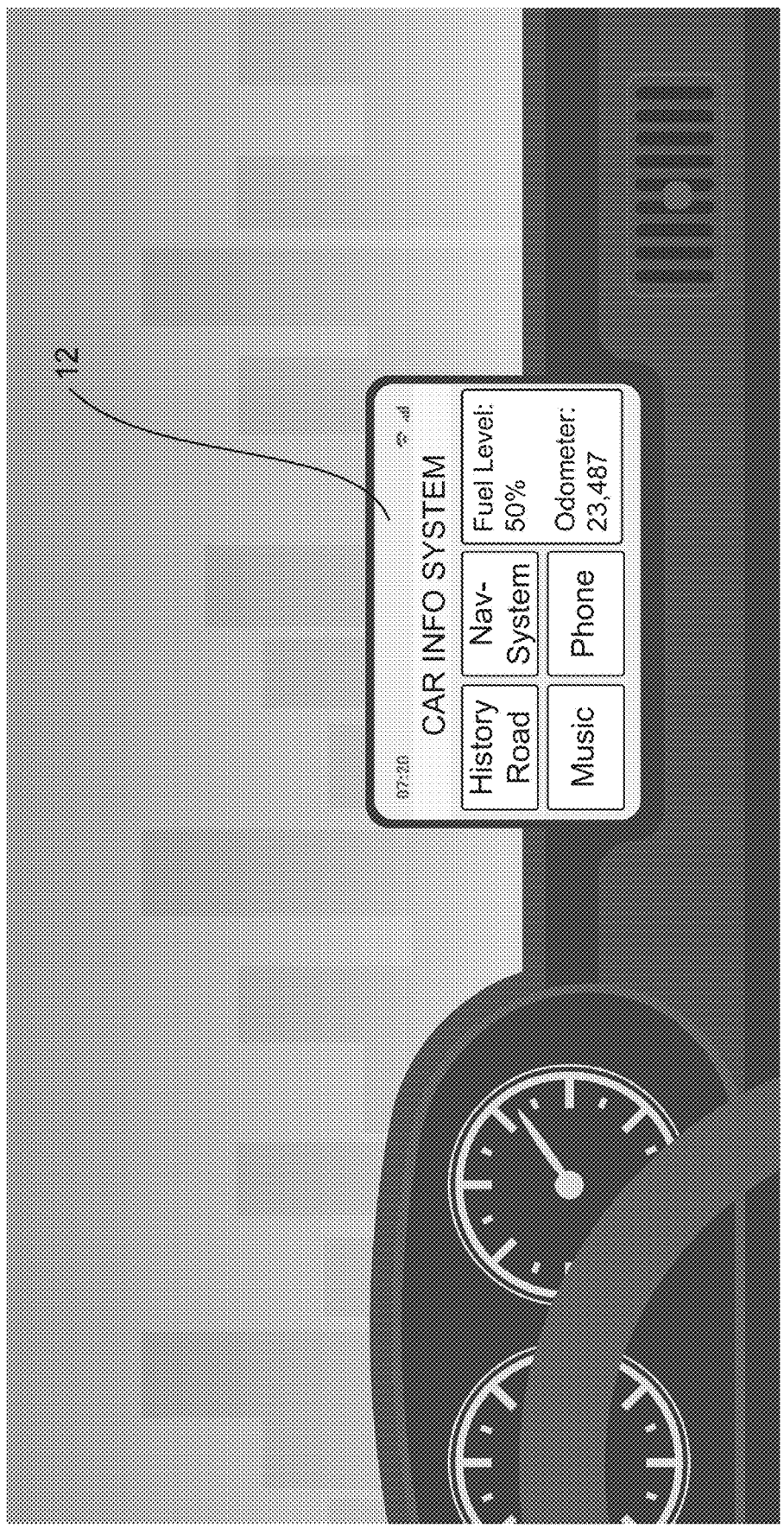
FIG. 9A depicts a user computing device that is a vehicle computer of a travel-based geo-paired information system according to an embodiment.
Figure 9B:
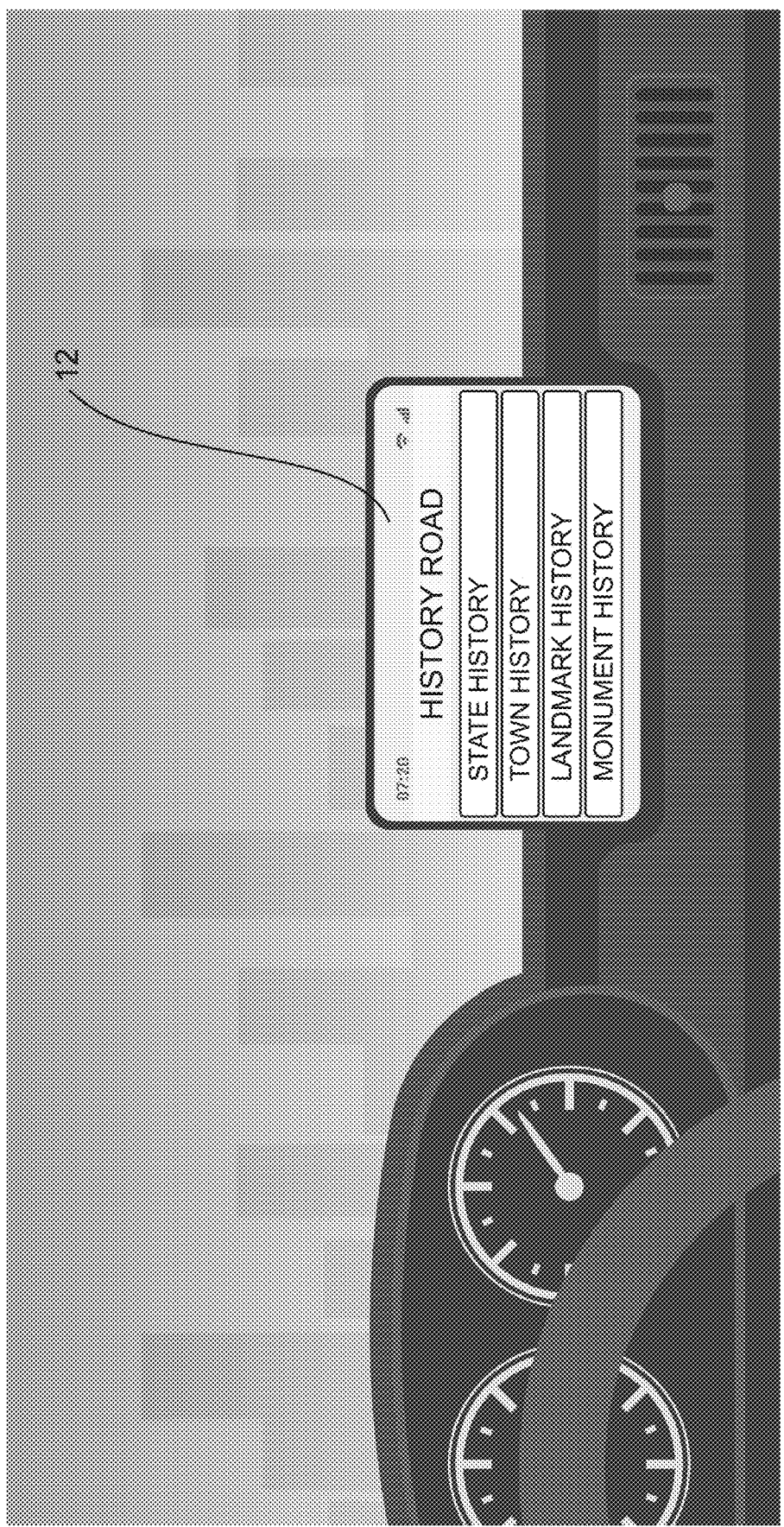
FIG. 9B depicts a user computing device that is a vehicle computer of a travel-based geo-paired information system according to an embodiment.
Figure 9C:
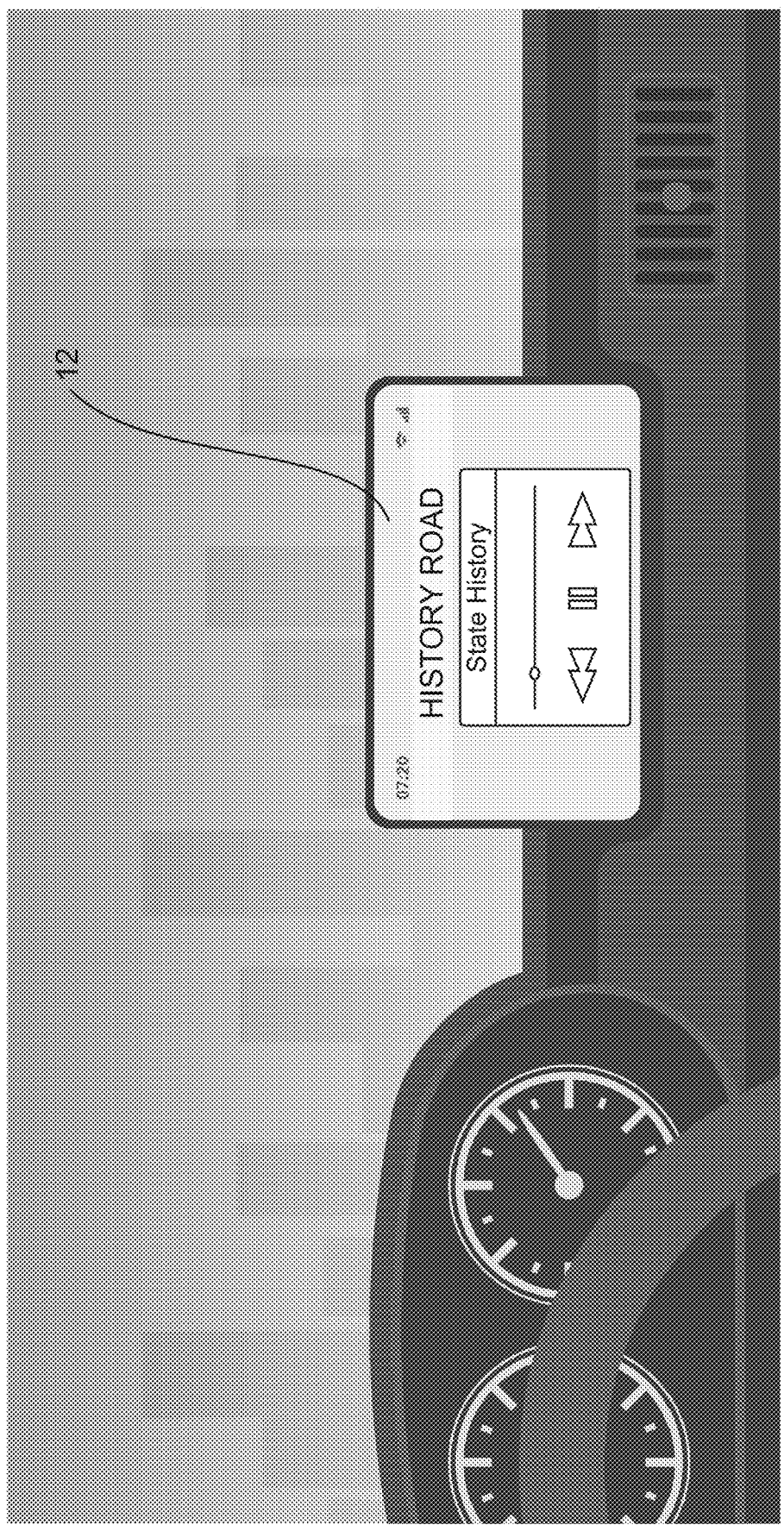
FIG. 9C depicts a user computing device that is a vehicle computer of a travel-based geo-paired information system according to an embodiment.
Figure 9D:
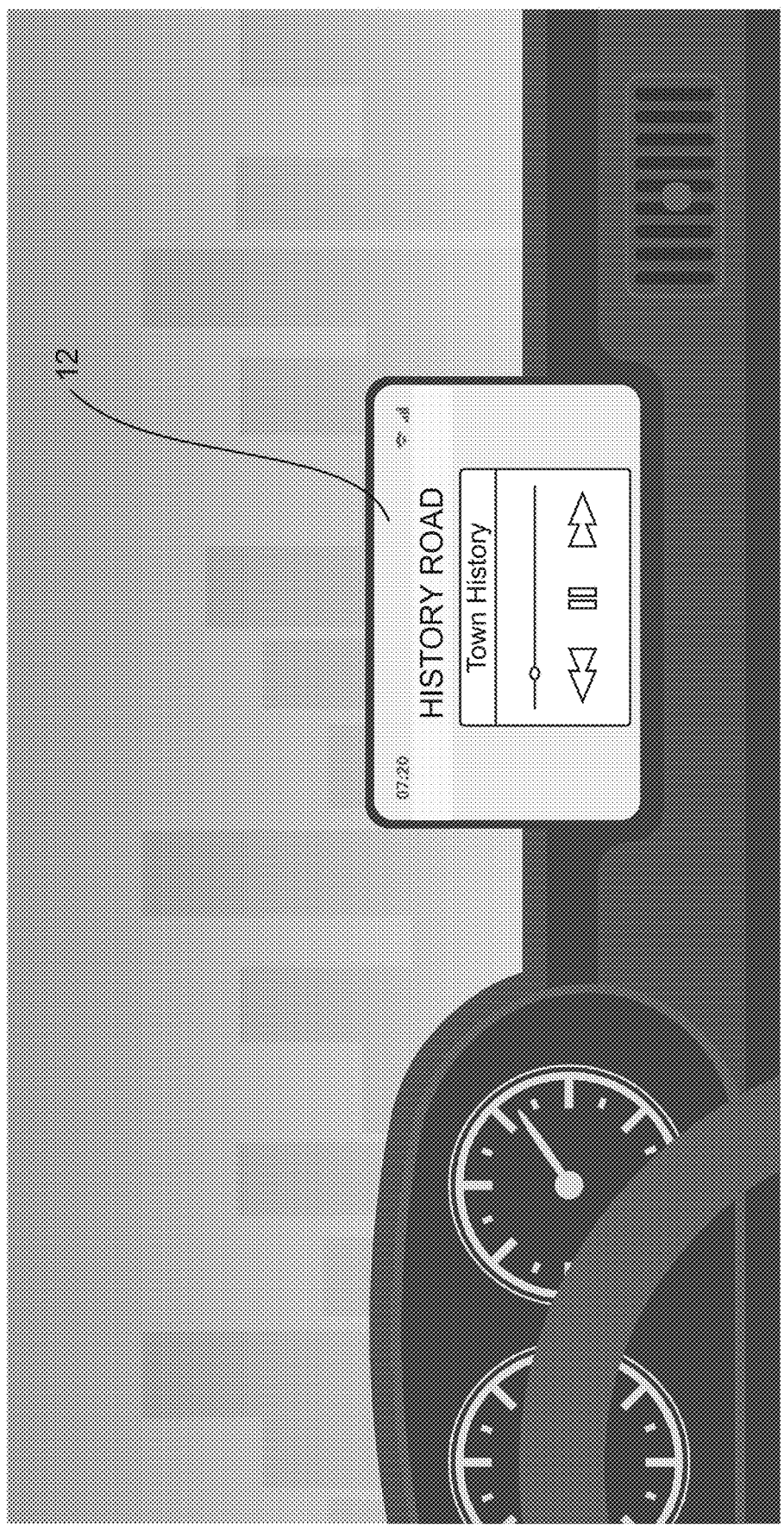
FIG. 9D depicts a user computing device that is a vehicle computer of a travel-based geo-paired information system according to an embodiment.
Figure 9E:
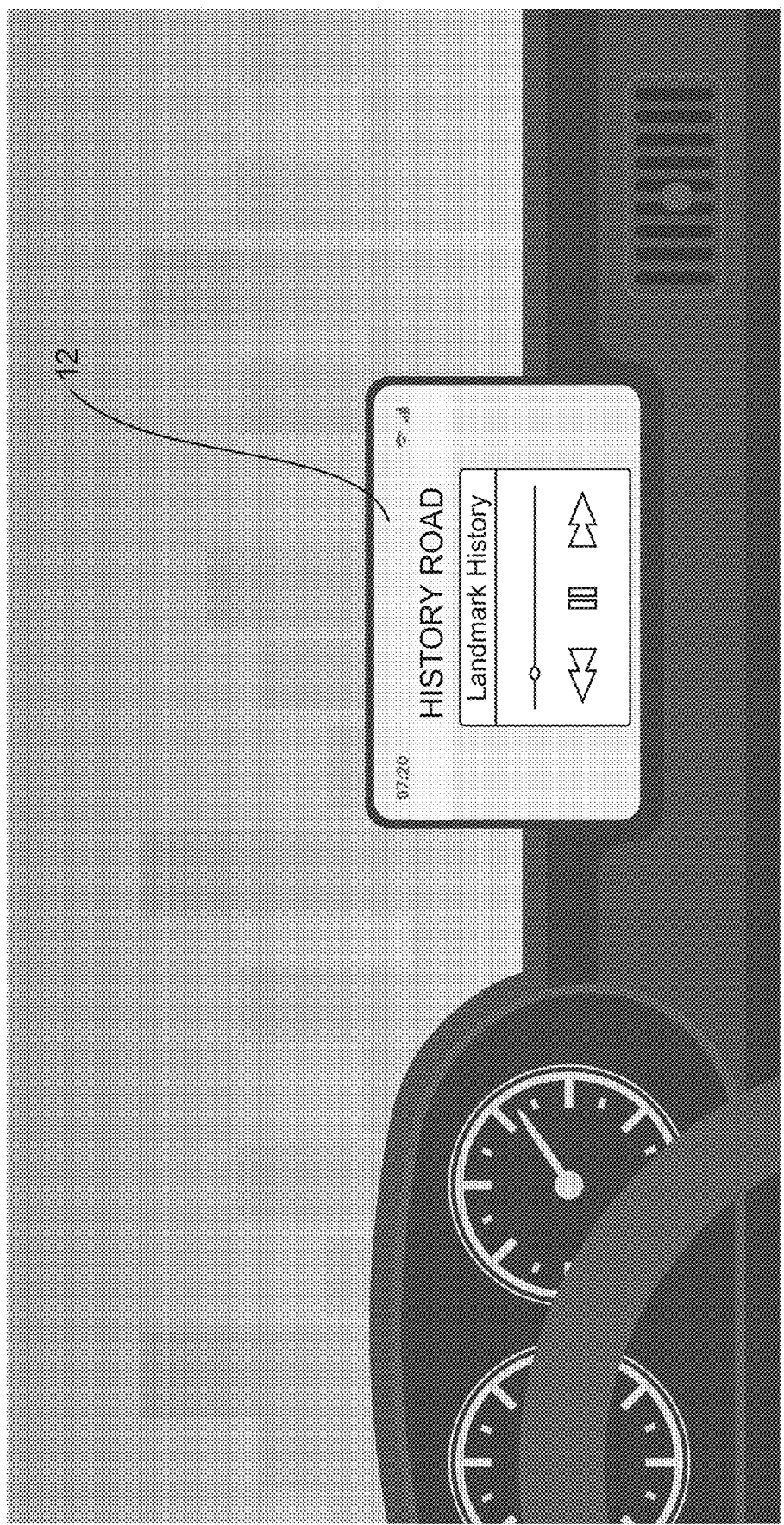
FIG. 9E depicts a user computing device that is a vehicle computer of a travel-based geo-paired information system according to an embodiment.
Figure 9F:
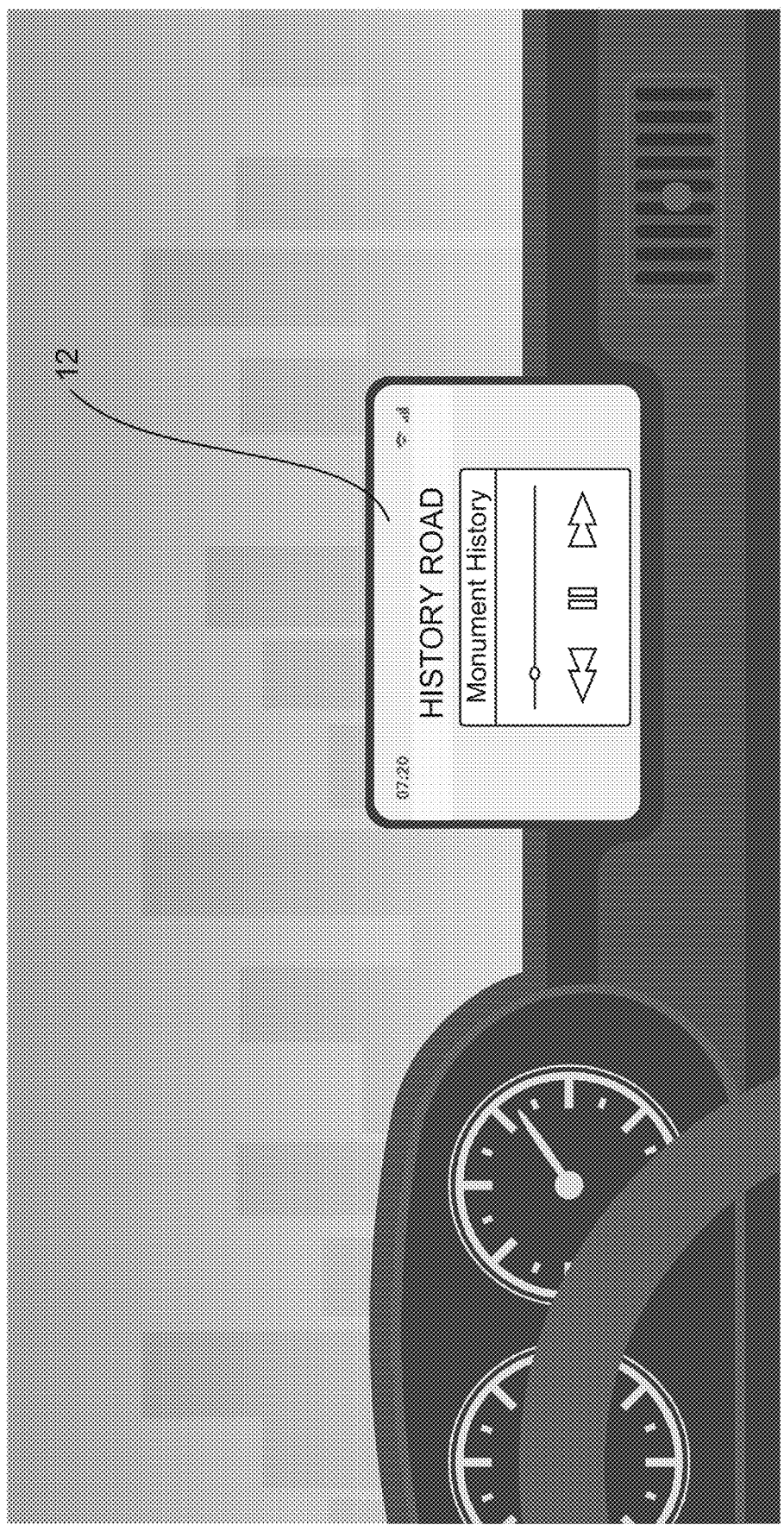
FIG. 9F depicts a user computing device that is a vehicle computer of a travel-based geo-paired information system according to an embodiment.

It will be understood that the geo-paired information may correspond to various types of content the user is interested in. Additionally, the user computing device 12 may be a vehicle computer that can download and install applications on the vehicle computer. For example, FIGS. 9A-9D depict various types of geo-paired information that may match user interest and operable on a user computing device 12 that is a vehicle computing device. FIG. 9A depicts a user computing device 12 that is a vehicle computer that includes a touchscreen that depicts an application operating to employ the system 10. The user computing device 12 may display a user interface that includes selectable elements for all types of geo-paired information such as history, state history, town history, landmark/natural feature history, monument history and the like that may be associated with particular geo locations of particular points of interest. FIG. 9B depicts a user computing device 12 presenting or playing a state history related geo-paired information, wherein the user may learn the history of a point of interest, such as a historical element from a state as the user crosses the state line, including state history, industrial history and the like. As shown in FIG. 9C, depicted is a user computing device 12 presenting or playing a town history related geo-paired information, wherein the user may learn the history of a point of interest, such as a historical element from a town as the user travels through or by a town. As shown in FIG. 9D, depicted is a user computing device 12 presenting or playing a landmark/natural feature history related geo-paired information, wherein the user may learn the history of a point of interest, such as a the Grand Canyon, the Mississippi River or other type of natural feature. As shown in FIG. 9E, depicted is a user computing device 12 presenting or playing a monument history related geo-paired information, wherein the user may learn the history of a point of interest, such as the Alamo, Gettysburg or other type of monument.

Figure 10:
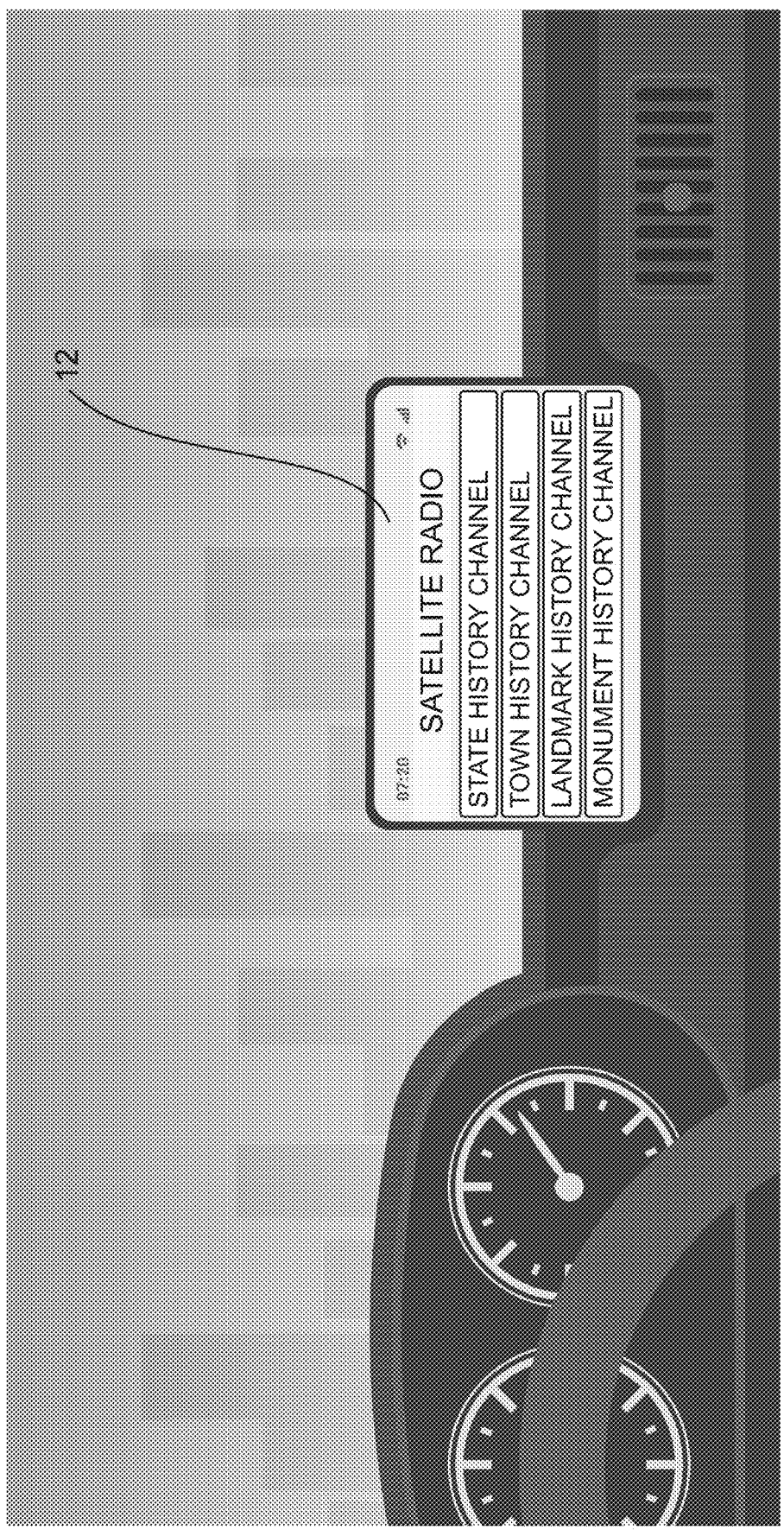
FIG. 10 depicts a user computing device that is a vehicle computer operating a satellite radio system in coordination with a travel-based geo-paired information system according to an embodiment.

Another embodiment, as shown in FIG. 10, my include the system operating as part of a satellite radio system. For example, and without limitation, FIG. 10 depicts a vehicle computer 12 (user computing device 12) that includes a touchscreen that depicts a satellite radio system employing the system 10. The vehicle computer 12 may display a user interface that is typical of the satellite radio system that includes selectable elements or radio channels for all types of geo-paired information such as history, state history, town history, landmark/natural feature history, monument history and the like that may be associated with particular geo locations of particular points of interest. This allows the satellite radio station to tailor the content to the location of the vehicle 20.

Figure 11A:
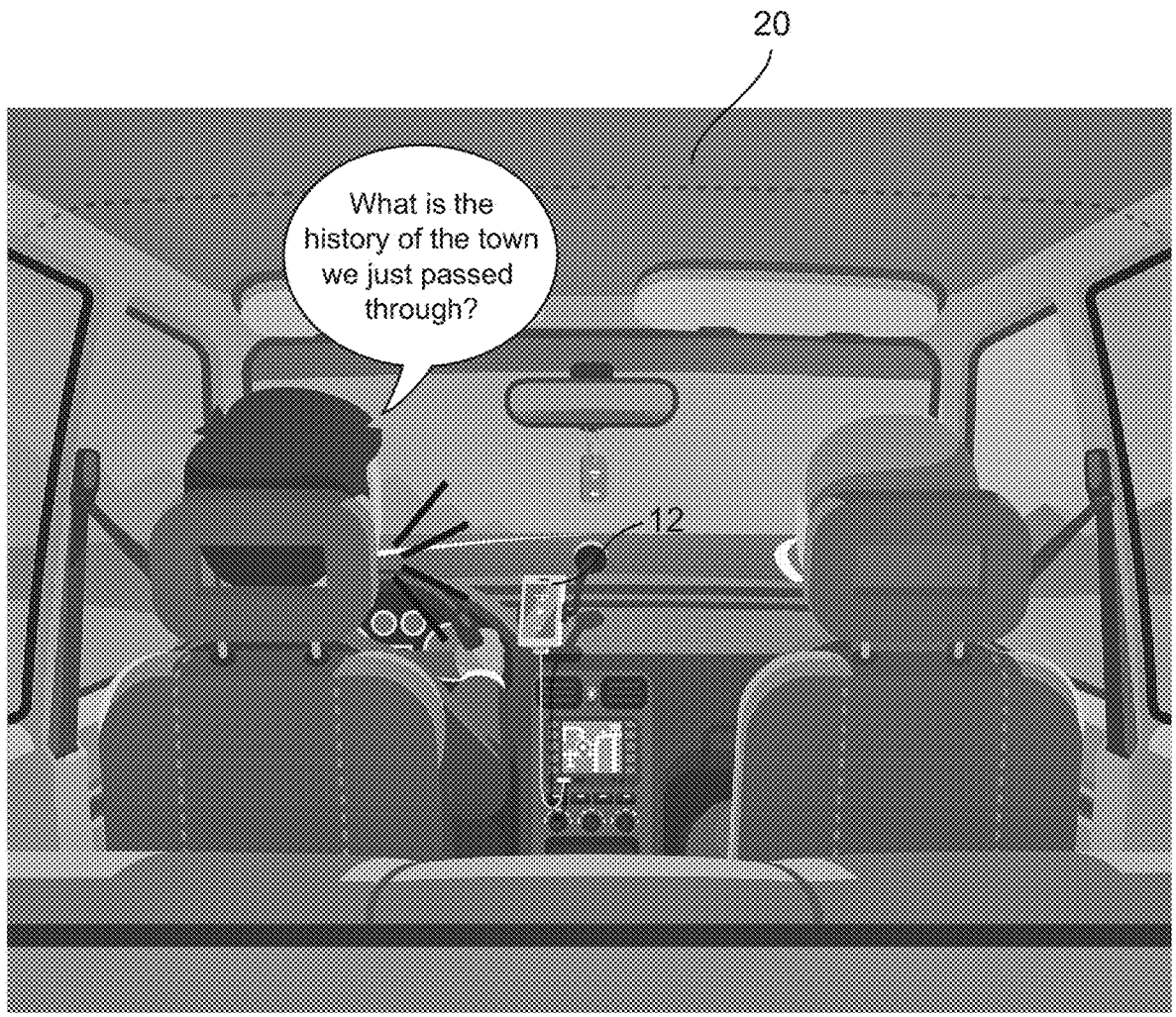
FIG. 11A depicts a user computing device of a travel-based geo-paired information system operating with audible prompts and commands according to an embodiment.
Figure 11B:
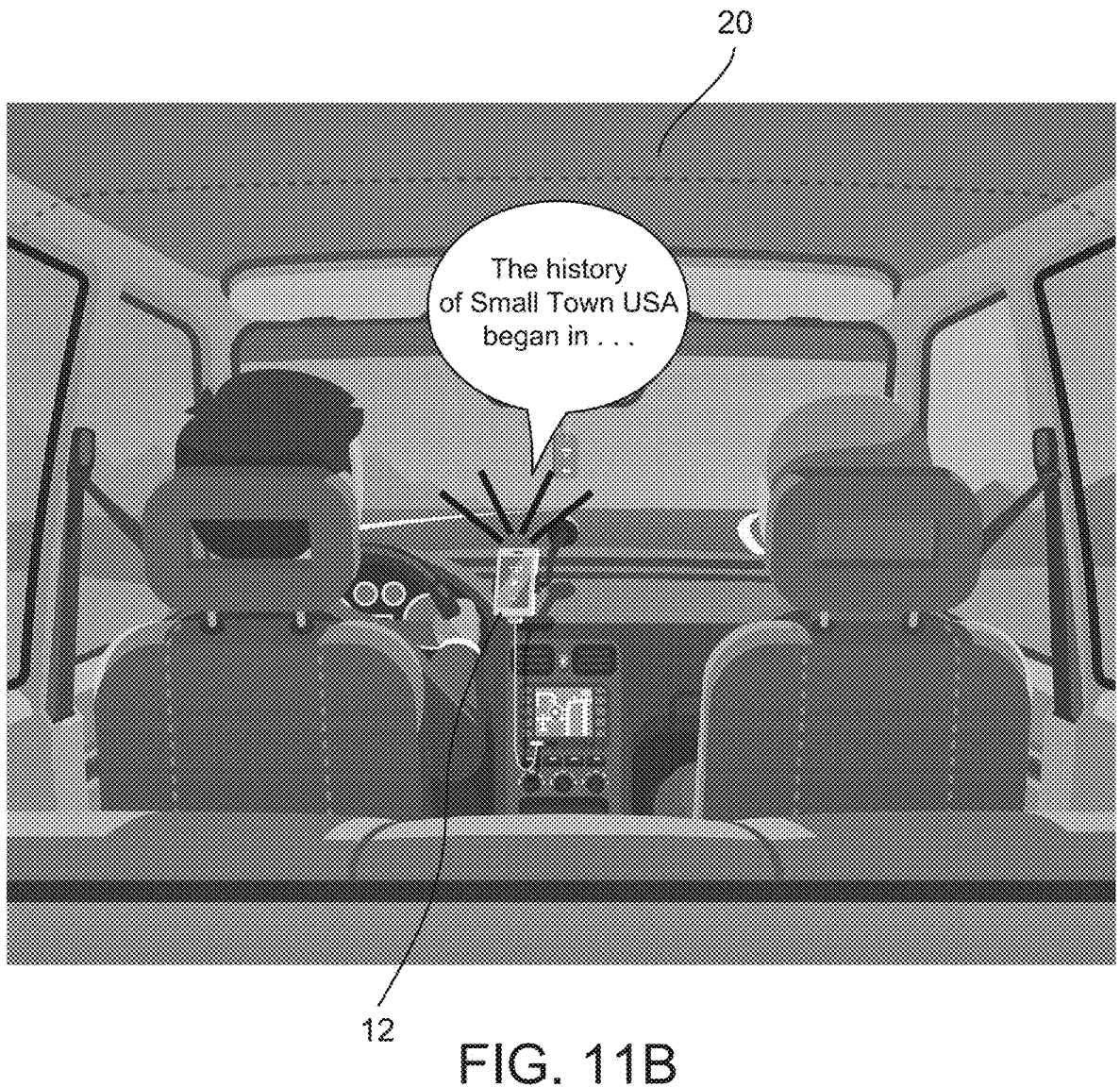
FIG. 11B depicts a user computing device of a travel-based geo-paired information system operating with audible prompts and commands according to an embodiment.

In embodiments, the travel-based geo-paired information system 10 may include a user computing device 12 operating an application that may be programmed to receive and send audible prompts, wherein the audible prompts result in the system operating as though there are tactile input. It will be understood that natural language processing may be included as part of the system that allows for the receipt of audible prompts and/or commands and processing the audible prompts and/or commands in order to trigger operations by the server 14, the user computing device 12 or the like. One example may include a user instigating the prompt. For example, FIGS. 11A and 11B depict a user in a vehicle 20 that initiates an audible command to the user computing device 12, such as, "What is the history of the town we just passed?" as depicted in FIG. 11A. The user computing device 12 may then, in communication with the server 14 or from downloaded content, receive instructions or execute instruction respectively to then play the content requested, as depicted in FIG. 11B.

Figure 12A:
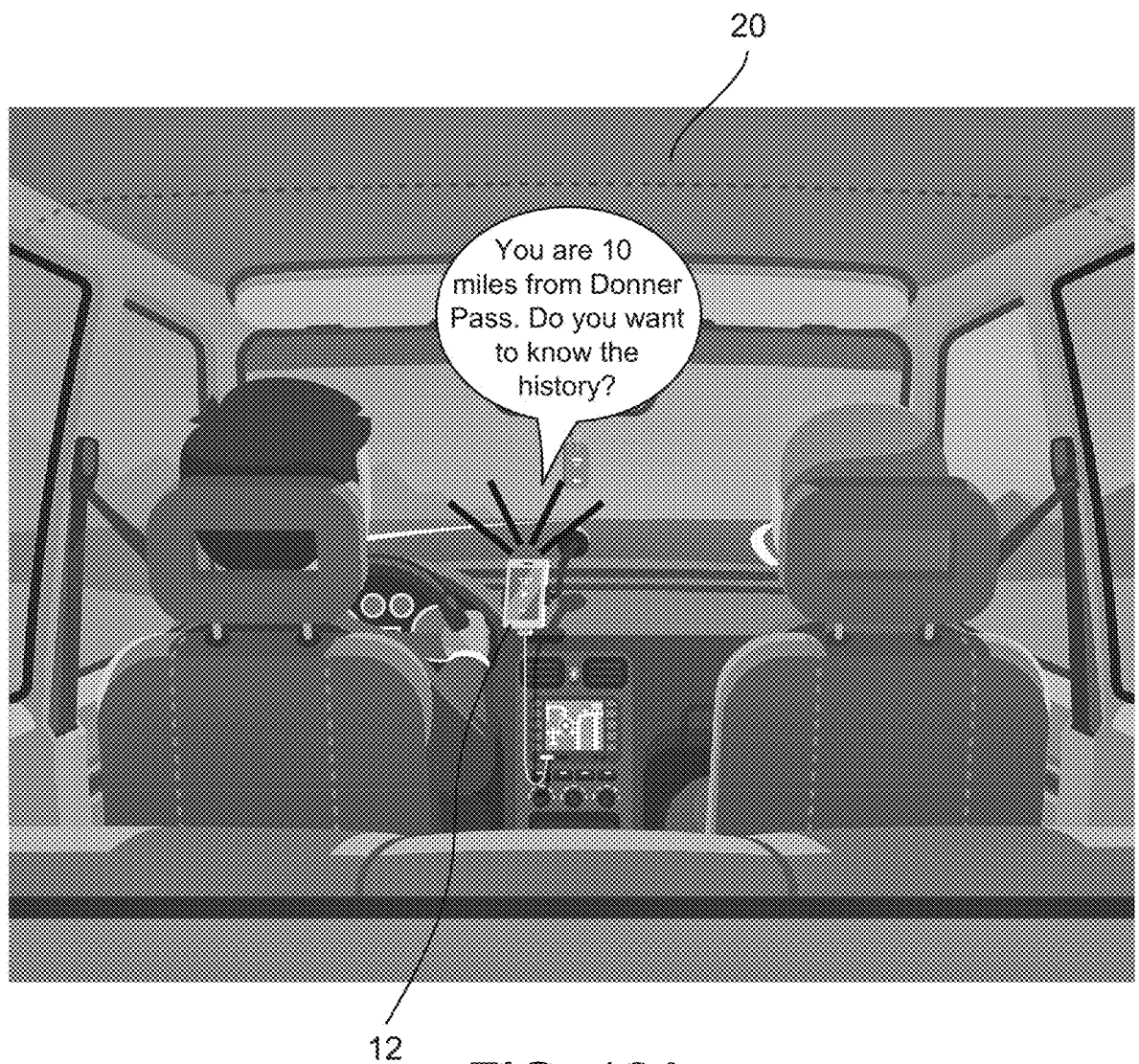
FIG. 12A depicts a user computing device of a travel-based geo-paired information system operating with audible prompts and commands according to an embodiment.
Figure 12B:
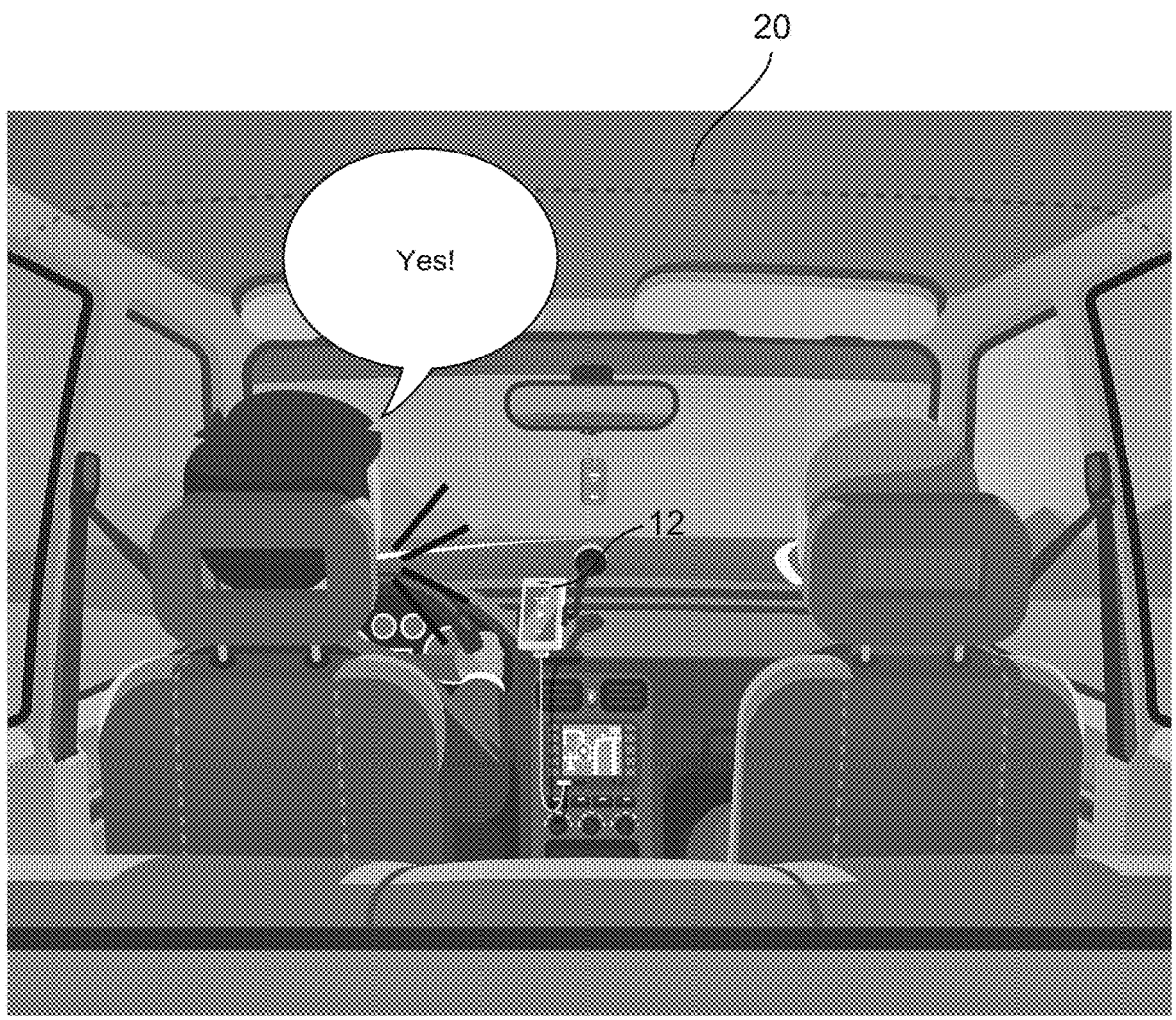
FIG. 12B depicts a user computing device of a travel-based geo-paired information system operating with audible prompts and commands according to an embodiment.
Figure 12C:
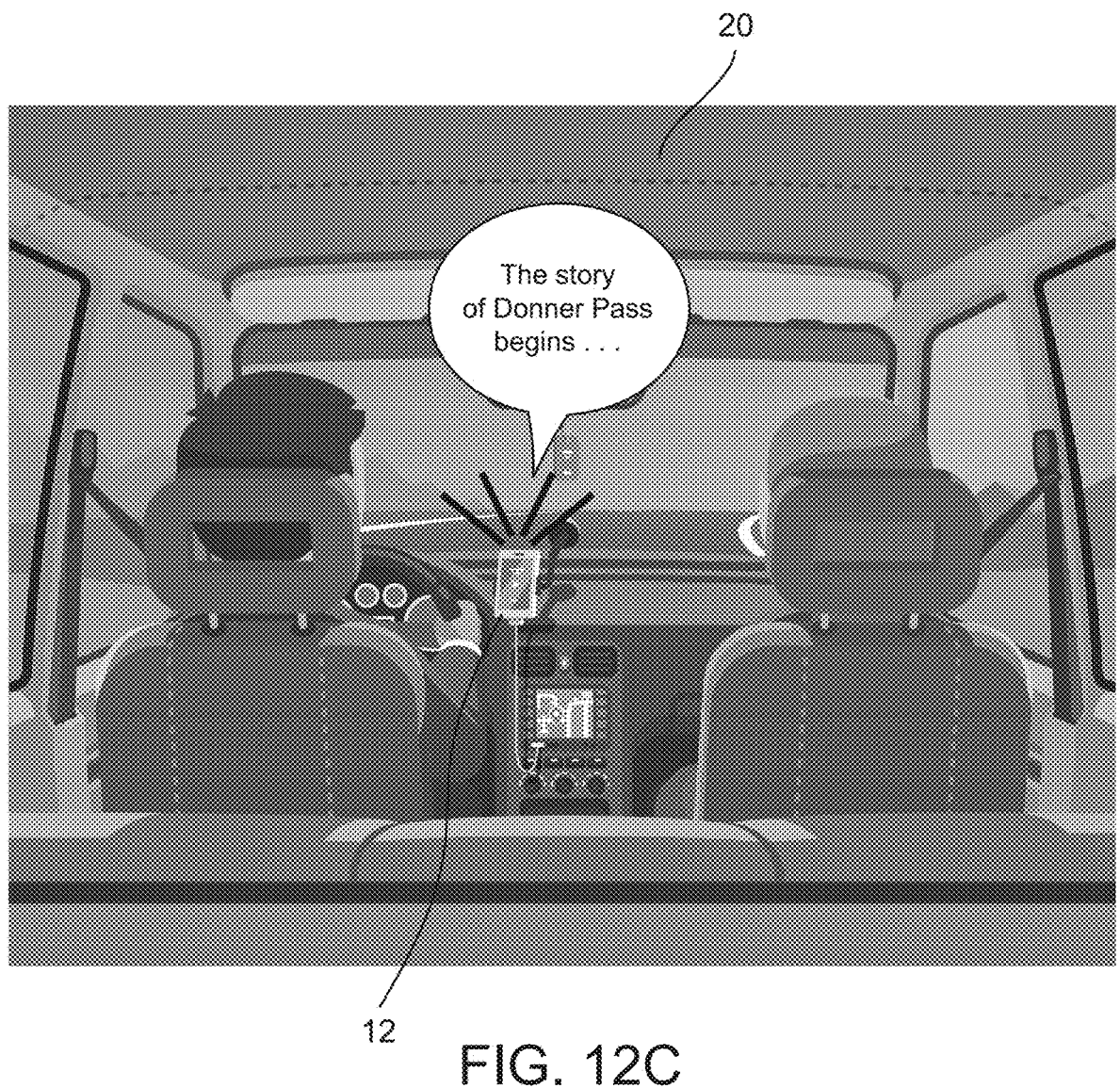
FIG. 12C depicts a user computing device of a travel-based geo-paired information system operating with audible prompts and commands according to an embodiment.

In other embodiments, such as that shown in FIGS. 12A-12C, the user computing device 12, based on the geo-location of the user computing device 12, may initiate an audible prompt. For example, and without limitation, the user computing device 12 may send geo-location relevant prompt. The relevant prompt may correspond with the preferences of the user that is stored in the server 14 associated with the user account. The prompt may include a question eliciting a verbal response, such as, "You are 10 miles from Donner Pass. Do you want to the know the history?" as depicted in FIG. 12A. The user computing device 12 may then automatically go into a listening mode to receive a verbal audible command from the user, such as "Yes" as shown in FIG. 12B. the command may be an affirmative or negative response, like "yes" or "no", wherein an affirmative response would result in the user computing device 12, in connection with the server 14 to play the geo-paired content on the user computing device 12 as shown in FIG. 12C. A negative audible command would result in not playing the geo-paired content. In embodiments, the server 14 may be programmed to send for playing on the user computing device 12, another audible prompt for a different type of geo-paired content from the initial audible prompt corresponding to the geo-location of the user computing device 12. This may continue until all geo-paired content has been presented in as an audible prompt. Further, after playing geo-paired content after an affirmative command, the system 10 may operate to continue to present additional audible prompts for other geo-paired content corresponding to the geo-location of the user computing device 12.

Figure 13A:
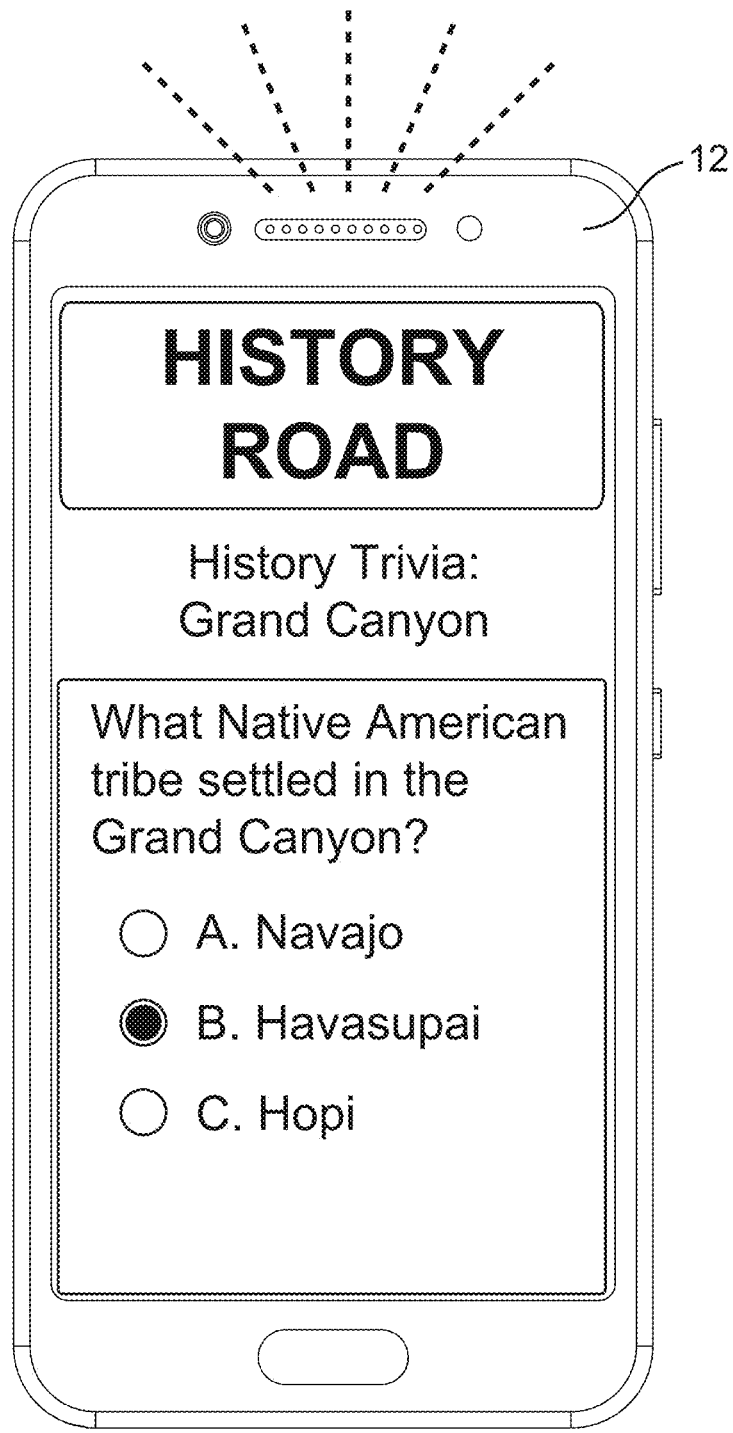
FIG. 13A depicts a user computing device of a travel-based geo-paired information system with a game as the geo-paired information or content according to an embodiment.
Figure 13B:
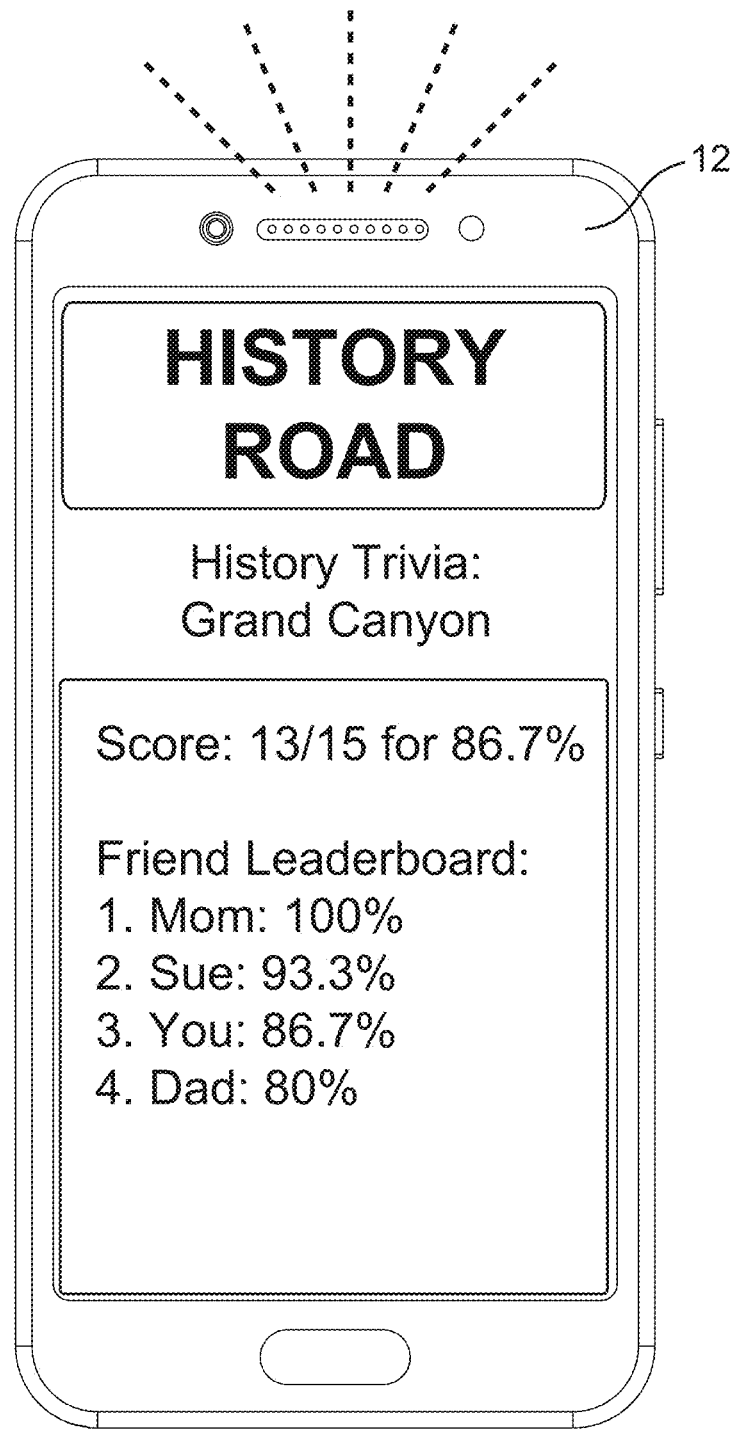
FIG. 13B depicts a user computing device of a travel-based geo-paired information system with a game as the geo-paired information or content according to an embodiment.

Additionally embodiments may include geo-paired content that is a game, such as that shown in FIGS. 13A-13B. For example, the server 14 may send for presenting on the user computing device 12, a game type content related to the geo-location of the user computing device 12. For example, and without limitation, the game may be a trivia game as depicted in FIG. 13A, or any other type of game that may include information corresponding to the geo-location of the user computing device 12. The trivia game as shown in FIG. 13A, may include a series of questions, such as the question related to the Grand Canyon as depicted in FIG. 13A. Further, the game may keep track of your score and compare to others in the vehicle 20 or to others that have played the same game in the same general geo-location and depict your score relative to others, such as that shown in FIG. 13B. It will be understood that may different types of games for various types of ages may be available, such as a trivia game for adults, or an adventure game or the like for kids, such as that shown in FIG. 14. The kids games will have age appropriate content to keep the interest of the children, teens or the like. The age of the users may be stored by the server 14 and the server 14 may be programmed to deliver the appropriate geo-paired content for presentation on the user computing device 12. It will also be understood that the system 10 may employ a natural language processing software that can recognize different voices, wherein multiple players may play the game using the same device and the server 14 or the user computing device 12 operating the natural language processing software may differentiate between different voices and track scores for all players using the same device. Additionally, the system 10 may be configured hat multiple vehicles may be able to play the game against each other in real time. The other vehicles may include friends, a caravan of vehicles traveling together, strangers or the like.

Figure 14:
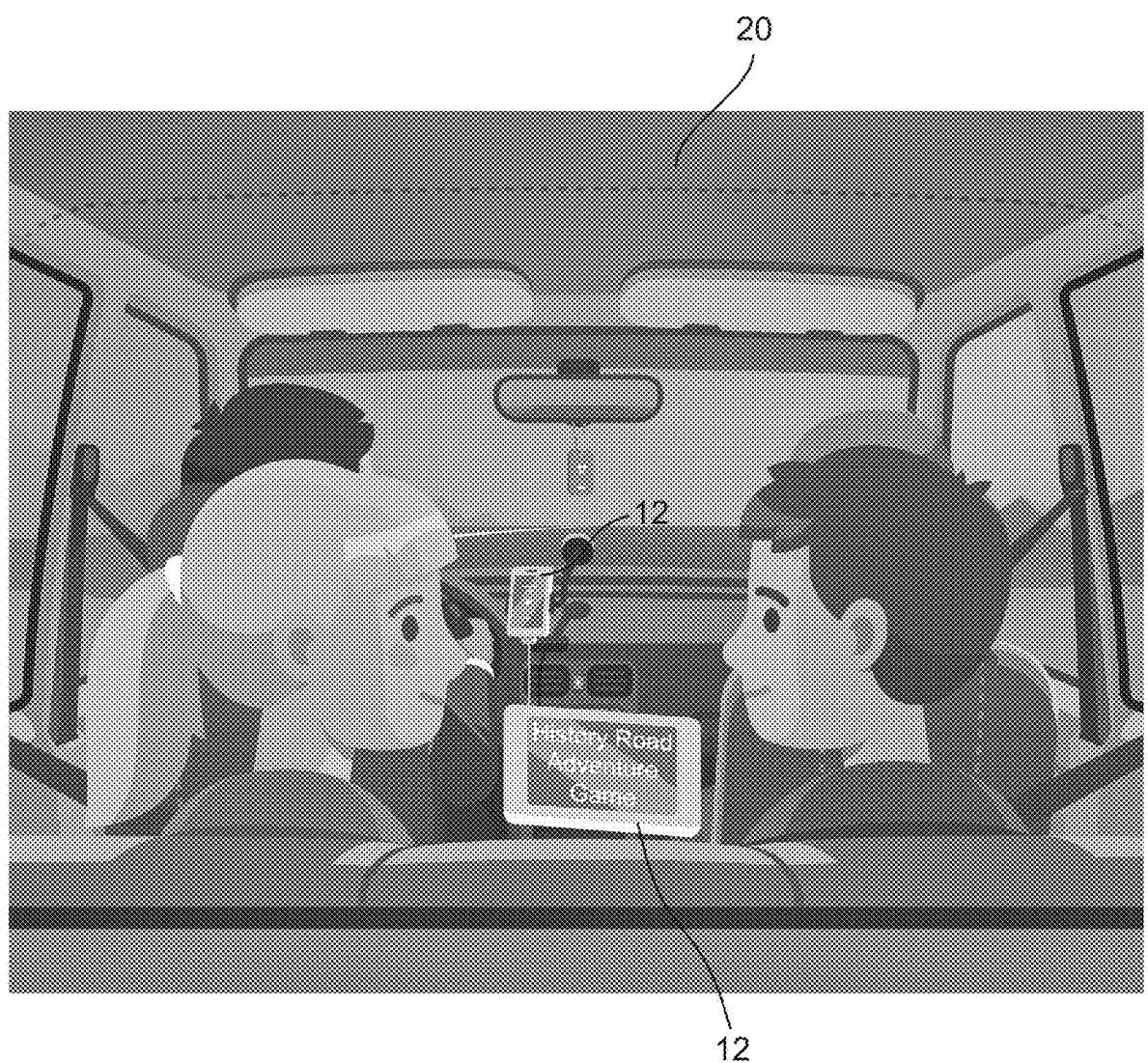
FIG. 14 depicts a user computing device of a travel-based geo-paired information system with a kid's game as the geo-paired information or content according to an embodiment.

Additionally, the game depicted in FIGS. 13A-14 may also be a game or quiz that can be utilized for educational curriculum. The user computing devices 12 may be operated by students and the questions may be directed to history or other information that the students are participating in such as during a field trip. The questions may be used for students to answer basic questions to show that they actually participated in the tour or even to log in hours to show that the student was there. Because this is location based and the location of the user computing device 12 is determined, accessing the system by the student within proximity of the of the point of interest the students are supposed to be visiting can confirm their attendance at the point of interest or event that brings the students within proximity.

Figure 15A:
FIG. 15A depicts a user computing device of a travel-based geo-paired information system with geo-location related news as the geo-paired information or content according to an embodiment.
Figure 15B:
FIG. 15B depicts a user computing device of a travel-based geo-paired information system with geo-location related news as the geo-paired information or content having local headlines from local news sources according to an embodiment.
Figure 15C:
FIG. 15C depicts a user computing device of a travel-based geo-paired information system with geo-location related news showing as text after selecting a headline as the geo-paired information or content according to an embodiment.
Figure 15D:
FIG. 15D depicts a user computing device of a travel-based geo-paired information system with geo-location related news showing audio reading of the text after selecting a headline as the geo-paired information or content according to an embodiment.

Further still, in some embodiments, the system 10 may operate to provide geo-paired content that is news content corresponding to the geo-location of the user computing device 12. For example, and without limitation, the geo-paired content sent by the server 14 for presentation on the user computing device 12 may be news, such as regional news as depicted in FIG. 15A or local news as depicted in FIG. 15B, wherein the local and regional news is determined by the geo-location of the user computing device. In some embodiments, as shown in FIG. 15A, the geo-paired information may be presented in audio format. Additionally, as is shown in FIG. 15B, the server 14 may be programmed to send for display and selection on the user computing device 12, a list of headlines from local news sources. The user may then select a particular headline of the local news source, as depicted in FIG. 15C. The user may then read the text that is displayed on the user computing device 12 as shown in FIG. 15 C. In some conditions, such as the user is a driver of the vehicle, or if the user prefers listening to reading text, the user may select to have the text read to them, such as selecting the headphone icon button in FIG. 15C to then present an audio player, or the like as depicted in FIG. 15D. The text may be read to the user through the speaker of the user computing device 12 or a connected speaker or the like. The user computing device 12 may include programming that allows for text-to-speech technology that can read the text and present it in speech. The news may be in any format even though FIGS. 15A-15D depict the news being presented in text and audio format.

Figure 16:
FIG. 16 depicts a user computing device of a travel-based geo-paired information system with a map having selectable points of interest corresponding to the geo-location of the user computing device according to an embodiment

Additionally, the system 10 may operate in such a way that the server 14 is programmed to send for display on the user computing device 12 a map depicting the route of travel of the user computing device 12. The map may include various selectable points of interest, such as the red pins depicted on the map of FIG. 16. The user can select a point of interest (see the highlighted pin in FIG. 16) from one or more points of interest shown in the map displayed on the user computing device 12. This will initiate the server 14 sending for presentation on the user computing device geo-paired information/content associated with the selected point of interest. The system 10 may then operate in a manner as the embodiments discussed previously with respect to FIGS. 1-18B.

Figure 17A:
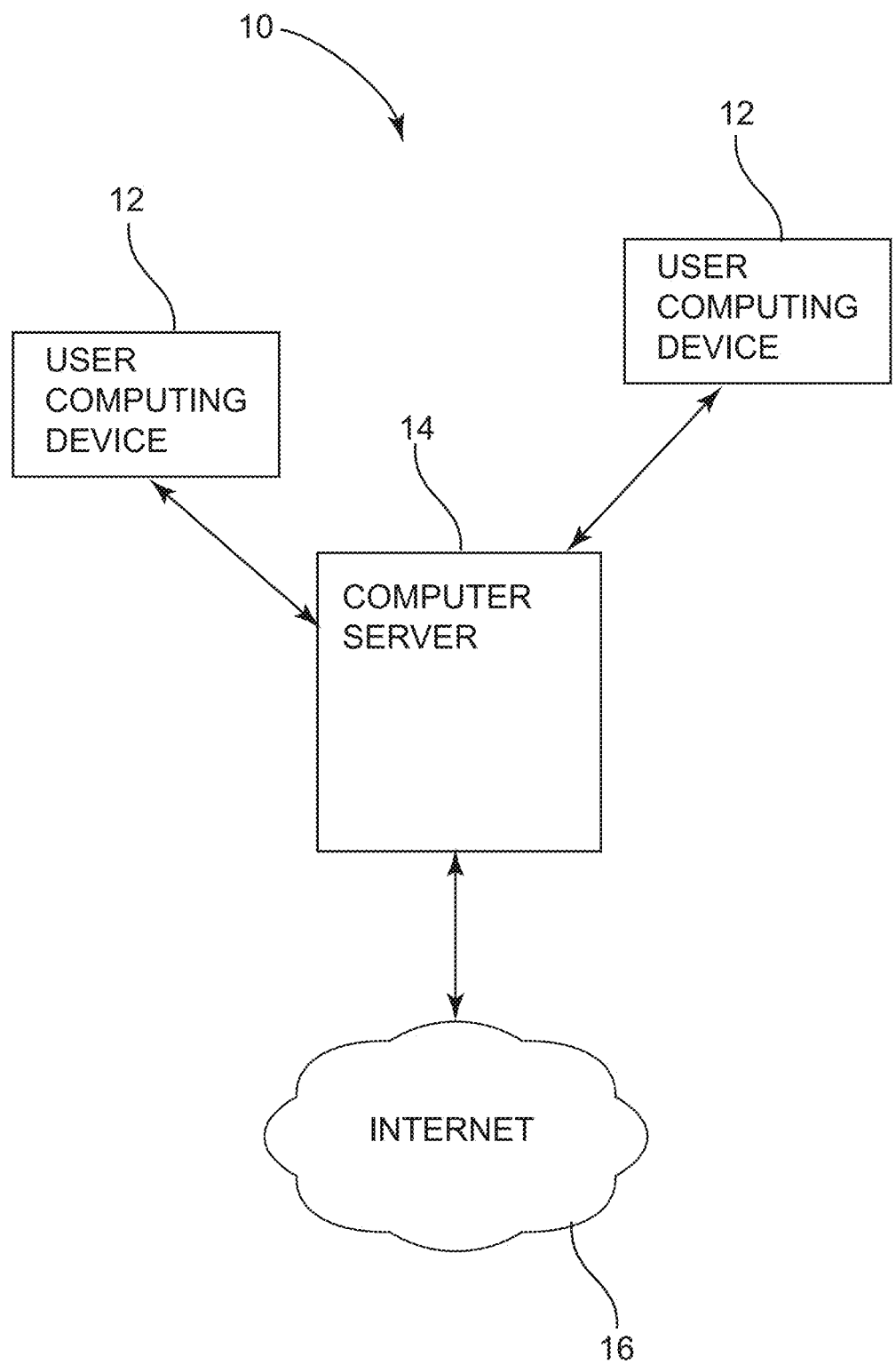
FIG. 17A is a diagrammatic view of a travel-based geo-paired information system according to an embodiment.
Figure 17B:
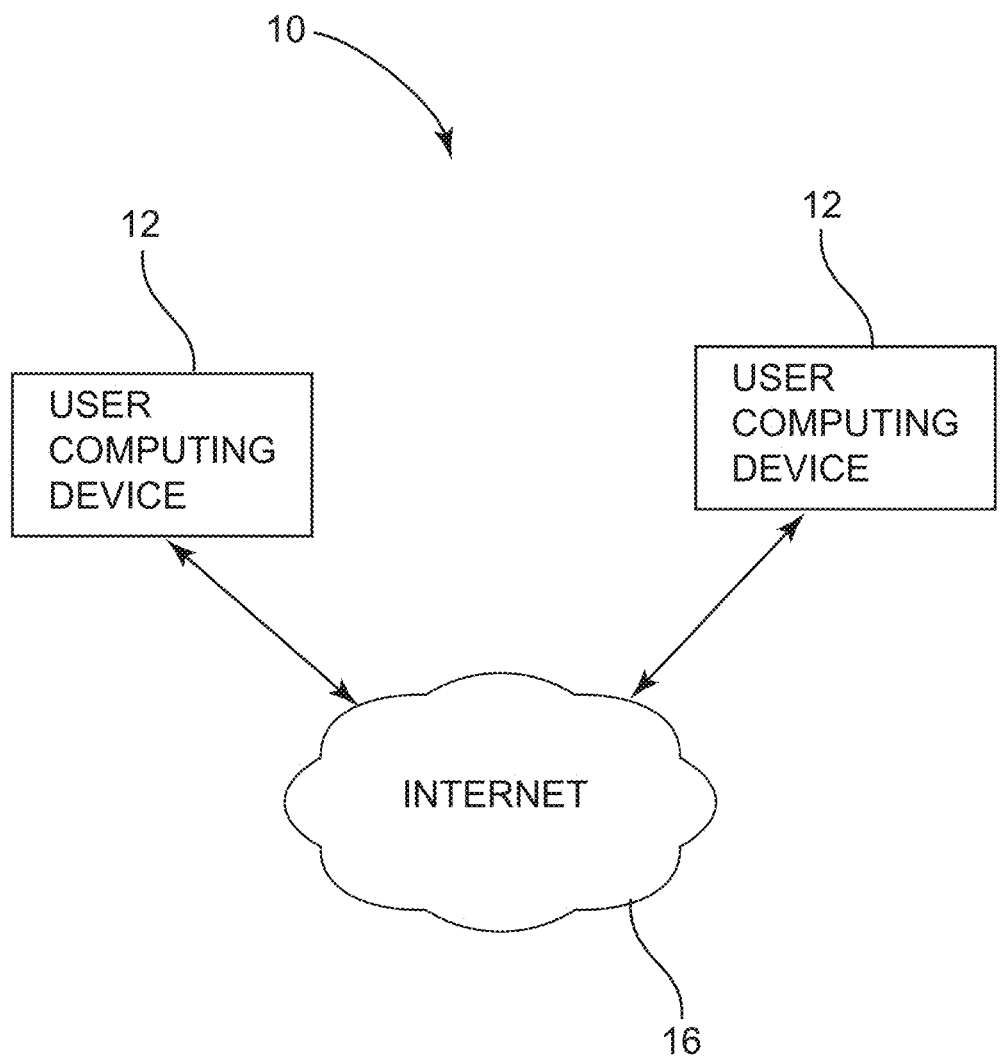
FIG. 17B is another diagrammatic view of a travel-based geo-paired information system according to an embodiment.

Another embodiment includes a system 10 as depicted in FIGS. 17A and 17B. The system 10 may include user computing devices 12 and a server 14, wherein each user computing device 12 is coupled to the computer server 14. This coupling may be a network connection, such as through an Internet connection, a Wi-Fi connection, a Bluetooth connection or the like, wherein the user computing devices 12 may communicate with and receive communication from the server 14. The user computing device 12 may include a desktop computer, a laptop, a tablet, a smartphone, a vehicle-installed computing device and the like. The server 14, in some embodiments, may be a cloud-based infrastructure architecture. The system 10 may also include the server 14 coupled to, or having access to, the Internet 16, wherein the server may access content located on the Internet 16 as part of the operation of the system 10. In other embodiments, as shown in FIG. 17B, the user computing devices 12 may be coupled directly to the Internet 16 and the operations of the system described as programming on the server 14, may be stored and operated on the user computing device 12.

Figure 18A:
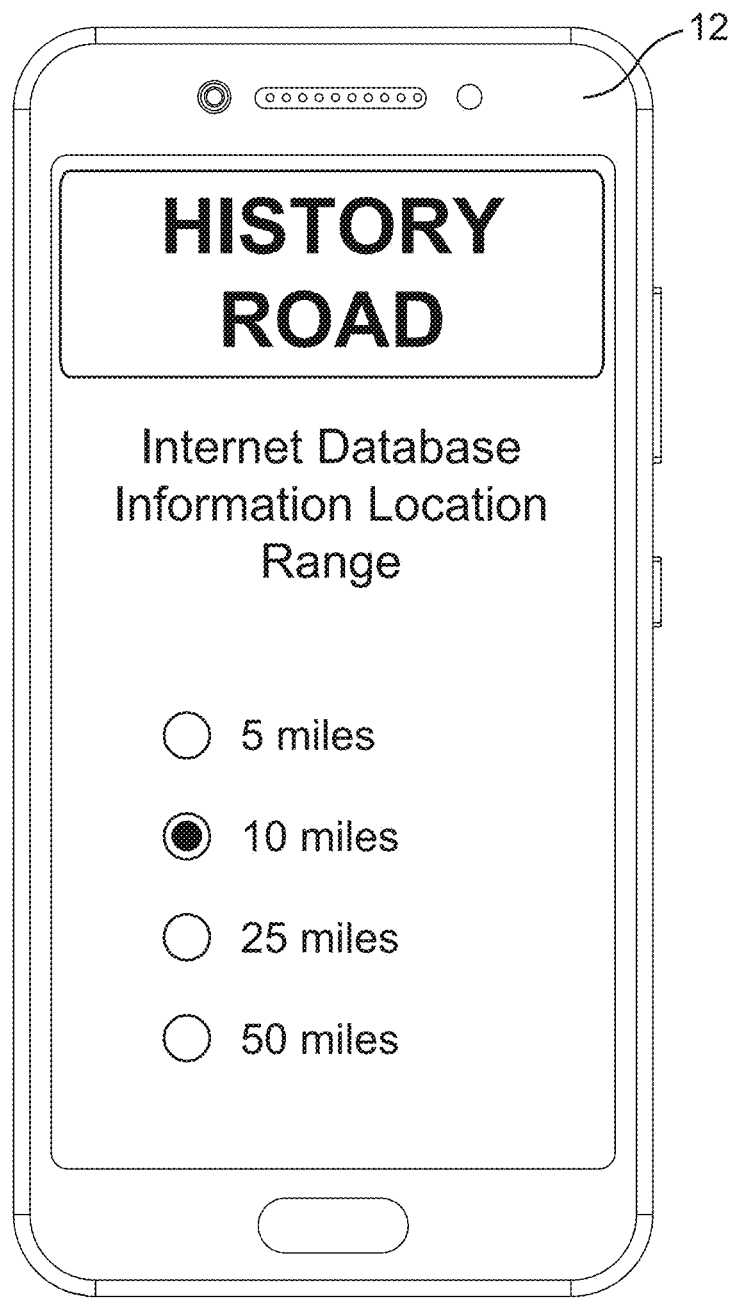
FIG. 18A depicts a user computing device of a travel-based geo-paired information system with geo-location related information from online sources as the geo-paired information or content according to an embodiment.
Figure 18B:
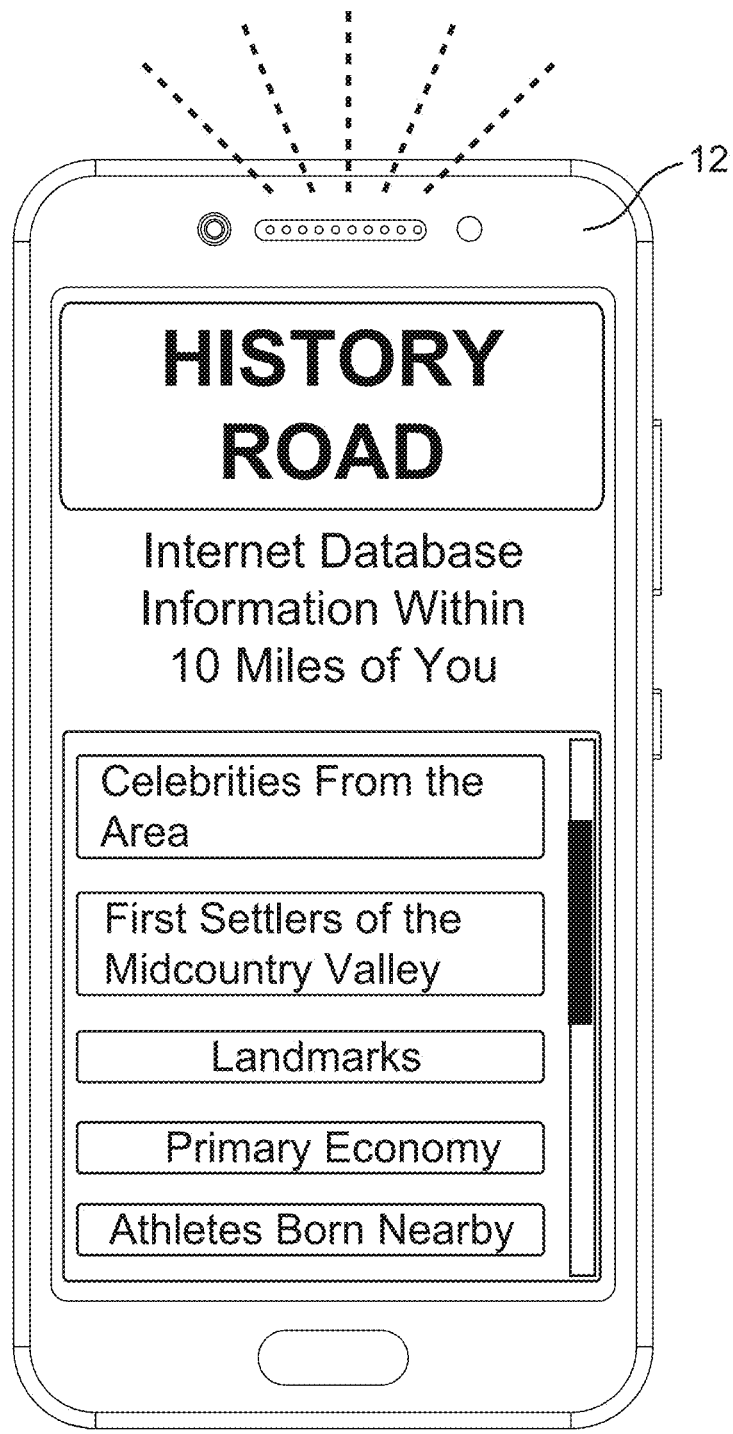
FIG. 18B depicts a user computing device of a travel-based geo-paired information system with geo-location related information from online sources as the geo-paired information or content according to an embodiment.
Figure 18C:
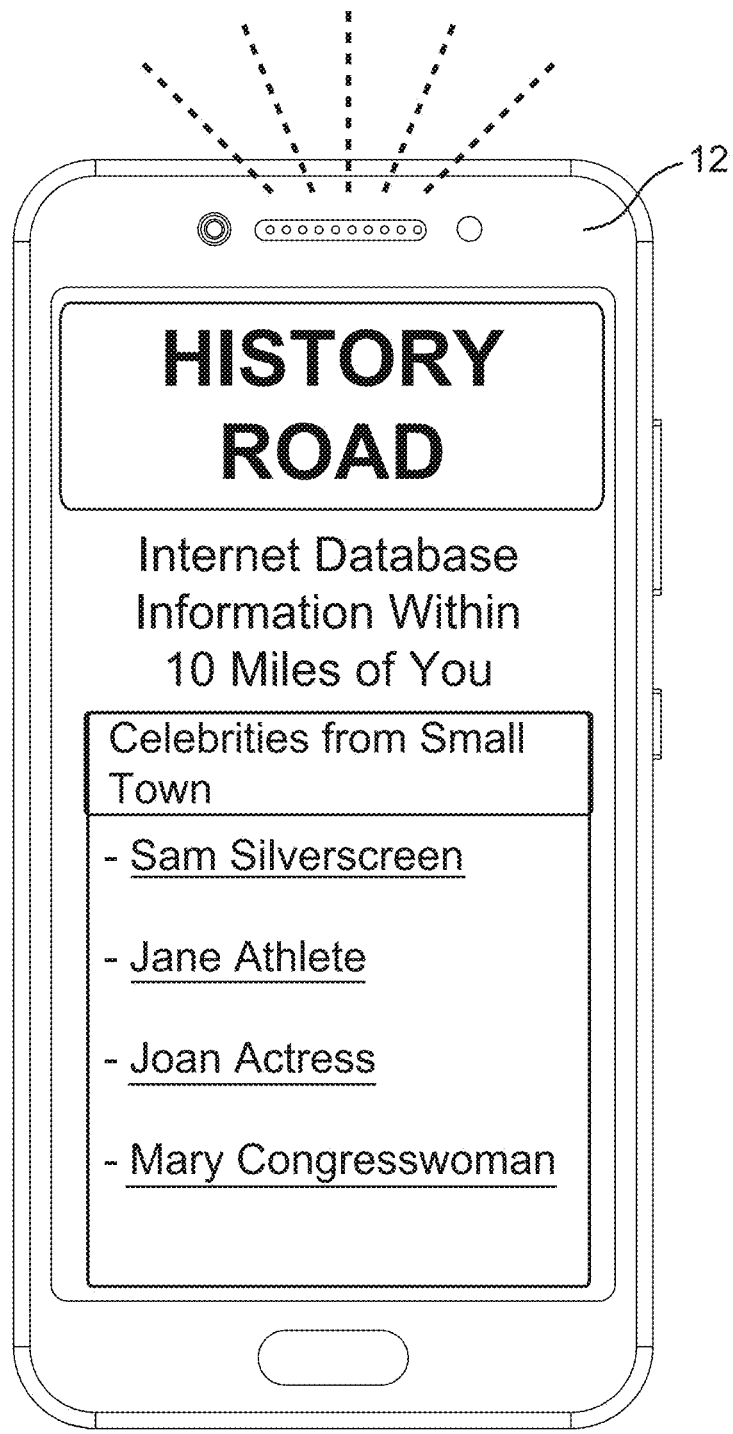
FIG. 18C depicts a user computing device of a travel-based geo-paired information system with geo-location related information as the geo-paired information or content having subcategories of a selected information type from online sources according to an embodiment.
Figure 18D:
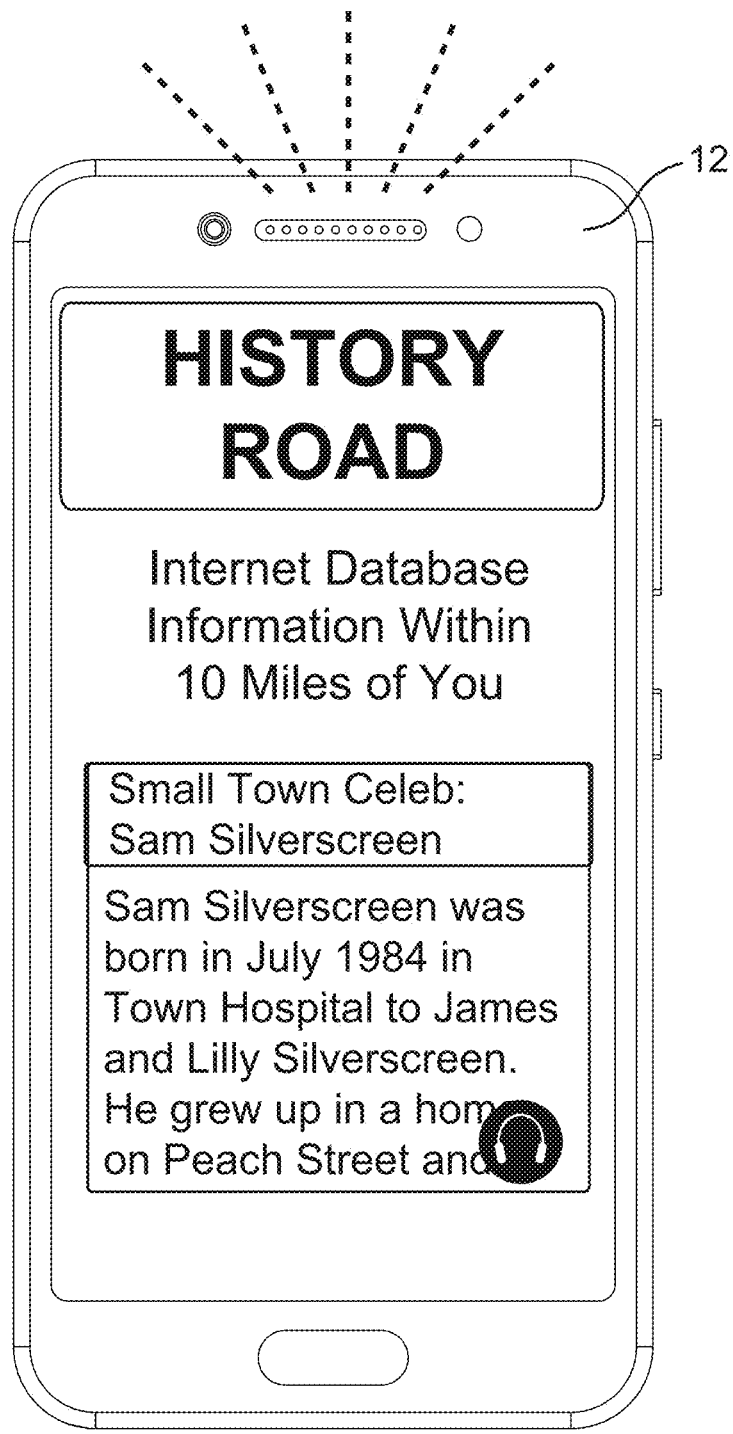
FIG. 18D depicts a user computing device of a travel-based geo-paired information system with geo-location related information showing as text after selecting a content type as the geo-paired information or content according to an embodiment.
Figure 18E:
FIG. 18E depicts a user computing device of a travel-based geo-paired information system with geo-location related news showing audio reading of the text as the geo-paired information or content according to an embodiment.

The system 10 may operate to provide geo-paired content that is Internet content corresponding to the geo-location of the user computing device 12. For example, and without limitation, the geo-paired content sent by the server 14 for presentation on the user computing device 12 may be various Internet based information based on the location of the user computing device 12. The user may set a radius or location range that sets the boundary around the user computing device 12 that the system 10 will search for corresponding geo-paired information/content, such as 5 miles, 10 miles, 25 miles, 50 miles and the like, as shown in FIG. 18A. The server 14 may be programmed to receive the location of the user computing device 12 and then search the Internet 16 for information corresponding to the location of the user computing device 12. The Internet 16 may include sources, such as Wikipedia, news sources, historical sources and other sources that create and store content, archive information and content, aggregate information and the like. The server 14 my then send for display on the user computing device one or more selectable geo-paired information/content sources associated with or corresponding to the location of the user computing device 12, as depicted in FIG. 18B. The user may then select a particular Internet information source, as depicted in FIG. 18C that may then display subcategories for further user selection. The user may then select a subcategory, if there are subcategories, and the user computing device will be directed to or the server will send for display the text from the Internet information source discovered by the server 14 when the server searched the Internet 16. The user may then read the text that is displayed on the user computing device 12 as shown in FIG. 18D. In some conditions, such as the user is a driver of the vehicle, or if the user prefers listening to reading text, the user may select to have the text read to them, such as selecting the headphone icon button in FIG. 18D to then present an audio player, or the like as depicted in FIG. 18E. The text may be read to the user through the speaker of the user computing device 12 or a connected speaker or the like. The user computing device 12 may include programming that allows for text-to-speech technology that can read the text and present it in speech. The Internet information may be in any format even though FIGS. 18A-18E depict the Internet information being presented in text and audio format.

It will be understood that in the system as shown in FIGS. 17A-18D, that the content accessible to the system 10 can be very broad. Rather than producing and storing its own content, the system may access all content available on the Internet 16 and provide it for consumption by the user computing device 12 as it corresponds to the location of the user computing device. This opens the system 10 to the ability to obtain information from a number of sources accessible from the Internet 16, such as, but not limited to, social media sources like Facebook, Instagram, TikTok or other social media platforms or feeds that correspond to the location of the user computing device 12, being part of a history club on Facebook or the like where the system 10 would push certain information to the user computing device based on geo-location of the user computing device 12, play online short videos from sources like YouTube, and so forth. Further, the system may include various additional functionality, such as, without limitation, a game or awards system where a user can gather points for visiting many locations, creating for posts a user's history trail with sites visited or downloaded by geo-location of the user computing device, an interface to make friends with people that have visited several of the same locations, and so forth.

Figure 19A:
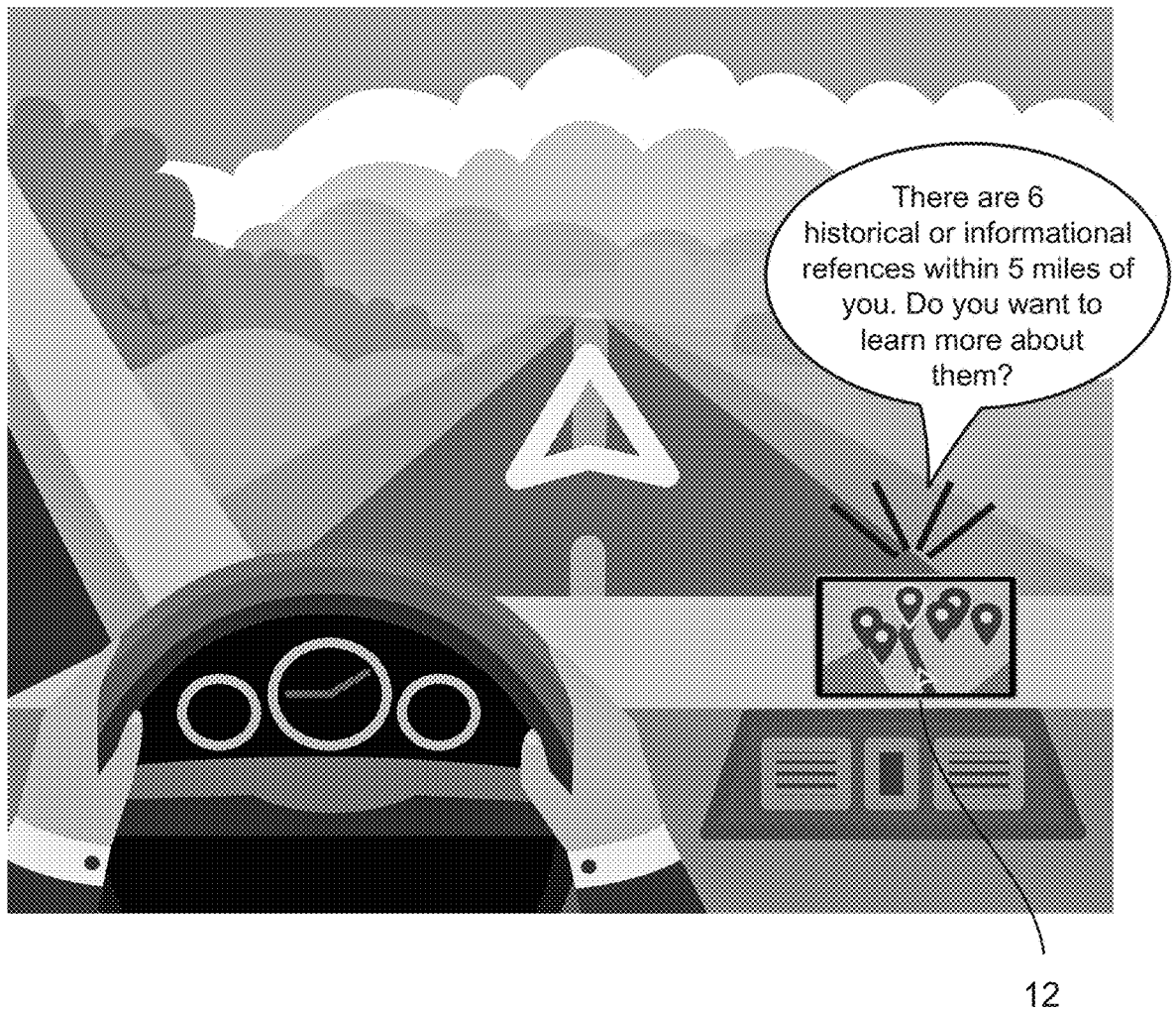
FIG. 19A depicts a user computing device of a travel-based geo-paired information system with geo-location related information from online sources as the geo-paired information or content according to an embodiment.
Figure 19B:
FIG. 19B depicts a user computing device of a travel-based geo-paired information system with geo-location related information from online sources as the geo-paired information or content according to an embodiment.
Figure 19C:
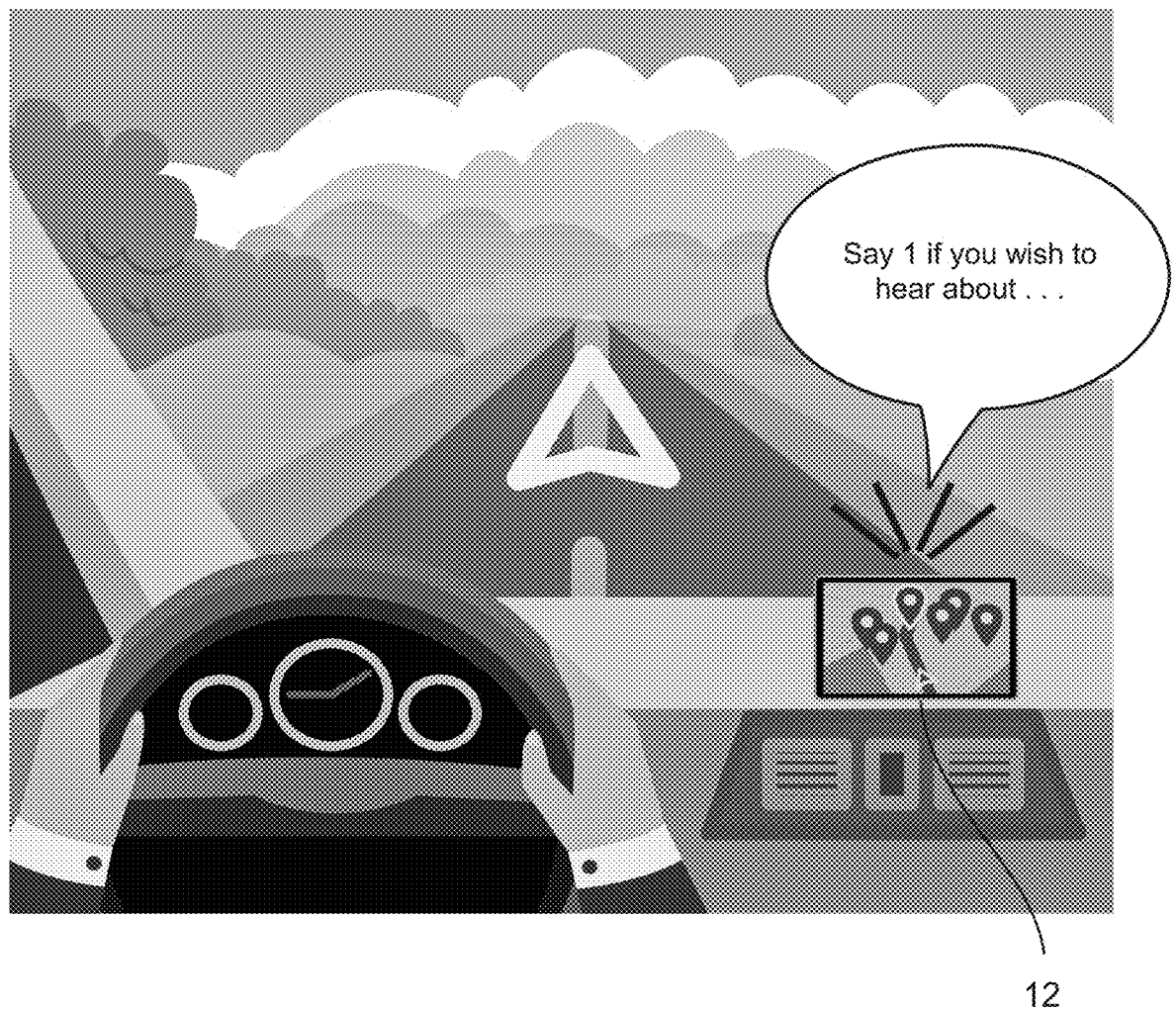
FIG. 19C depicts a user computing device of a travel-based geo-paired information system with geo-location related information from online sources as the geo-paired information or content according to an embodiment.

Further, it will be understood that natural language processing may be included as part of the system 10 depicted in FIGS. 17A-18D that allows for the receipt of audible prompts and/or commands and processing the audible prompts and/or commands in order to trigger operations by the server 14, the user computing device 12 or the like. For example, FIGS. 19A-19C depict a system that operates in this fashion. The user computing device 12, based on the geo-location of the user computing device 12, may initiate an audible prompt. For example, and without limitation, the user computing device 12 may send geo-location relevant prompt. The relevant prompt may correspond with the preferences of the user that is stored in the server 14 associated with the user account. The prompt may include a question eliciting a verbal response, such as, "There are 6 historical or informational references within 5 miles of you. Do you want to learn more about them?" as depicted in FIG. 19A. The user computing device 12 may then automatically go into a listening mode to receive a verbal audible command from the user, such as "Yes" as shown in FIG. 19B. the command may be an affirmative or negative response, like "yes" or "no", wherein an affirmative response would result in the user computing device 12, in connection with the server 14 to play the geo-paired content on the user computing device 12 as shown in FIG. 19C. A negative audible command would result in not playing the geo-paired content. In embodiments, the server 14 may be programmed to send for playing on the user computing device 12, another audible prompt for a different type of geo-paired content from the initial audible prompt corresponding to the geo-location of the user computing device 12. The audile command may further result in the user computing device 12 operating natural language processing to then send a second prompt, as shown in FIG. 19C, to allow the user to provide another verbal audible command in order to select the type of geo-paired information/content that the user wishes to be presented on the user computing device 12. This may continue until all geo-paired content has been presented in as an audible prompt. Further, after playing geo-paired content after an affirmative command, the system 10 may operate to continue to present additional audible prompts for other geo-paired content corresponding to the geo-location of the user computing device 12.

Embodiments may be available on or through the internet, such as through domain names reserved and owned by Applicant that include milemarkUSA.com (or respective state abbreviation in place of the "USA" text in the domain name), historyrd.com, history-road.com, historyroute.com, roadtick.com, historyplanner.com, roadtrip.news, localyokalnews.com, roadtripnewstoday.com, roadtripinfo.com, historyxm.com, podholes.com, hsitorytrail.com, roadtriptrivia.com, reaktheboredom.com, wikihere.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A method of using a travel-based geo-paired information system comprising:
   sending location information from a user computing device to a server, the location information including a location of the user computing device travelling within a vehicle;
   determining, by the server, whether the location of the user computing device within the vehicle is within a predetermined distance from a point of interest geolocation;
   retrieving, by the server from memory of the server, geo-paired information corresponding to the point of interest geolocation in response to determining the user computing device is within the predetermined distance from the point of interest geolocation;
   sending a audible prompt for playing on the user computing device prompting a verbal response from a user if the user wants to stream the geo-paired media;
   receiving an audible acknowledgment command from the user computing device that the user does want to stream the geo-paired media; and
   automatically streaming the geo-paired media from the server to the user computing device through a network connection as the user computing device is travelling within the vehicle and in proximity to the point of interest.

2. The method of claim 1, further comprising customizing the geo-paired media to correspond to previously entered user likes and dislikes in order to correspond the geo-paired media playing on the user computing device with the point of interest and the user likes and dislikes.

3. The method of claim 1, wherein the geo-paired media further comprises audio or video.

4. The method of claim 1, wherein multiple types of geo-paired media is associated with a point of interest geolocation.

5. The method of claim 4, further comprising determining the type of geo-paired media corresponding to the previously entered user likes and dislikes to automatically deliver to the user computing device, for streaming, the determined type of geo-paired media.

6. A method of using a travel-based geo-paired information system comprising:
   sending location information from a user computing device to a server, the location information including a location of the user computing device travelling within a vehicle;
   determining, by the server, whether the location of the user computing device within the vehicle is within a predetermined distance from a point of interest geolocation;
   retrieving, by the server from an Internet source, geo-paired information corresponding to the point of interest geolocation in response to determining the user computing device is within the predetermined distance from the point of interest geolocation;
   sending a audible prompt for playing on the user computing device prompting a verbal response from a user if the user wants to stream the geo-paired media;
   receiving an audible acknowledgment command from the user computing device that the user does want to stream the geo-paired media; and
   automatically streaming the geo-paired media from the server to the user computing device through a network connection as the user computing device is travelling within the vehicle and in proximity to the point of interest.

7. The method of claim 6, further comprising customizing the geo-paired media to correspond to previously entered user likes and dislikes in order to correspond the geo-paired media playing on the user computing device with the point of interest and the user likes and dislikes.

8. The method of claim 6, wherein the geo-paired media further comprises text.

9. The method of claim 8, further comprising operating text-to-speech programming to read the text of the geo-paired media and convert to speech played through the user computing device.

10. The method of claim 6, wherein the geo-paired media further comprises audio or video.

11. The method of claim 6, wherein multiple types of geo-paired media is associated with a point of interest geolocation.

12. The method of claim 11, further comprising determining the type of geo-paired media corresponding to the previously entered user likes and dislikes to automatically deliver to the user computing device, for streaming, the determined type of geo-paired media.

* * * * *